(12) United States Patent
Goto et al.

(10) Patent No.: US 10,191,281 B2
(45) Date of Patent: Jan. 29, 2019

(54) HEAD-MOUNTED DISPLAY FOR VISUALLY RECOGNIZING INPUT

(71) Applicant: Sony Corporaton, Tokyo (JP)

(72) Inventors: Tetsuro Goto, Tokyo (JP); Masatoshi Ueno, Kanagawa (JP); Kenichi Kabasawa, Saitama (JP); Toshiyuki Nakagawa, Kanagawa (JP); Daisuke Kawakami, Kanagawa (JP); Shinobu Kuriya, Kanagawa (JP); Tsubasa Tsukahara, Tokyo (JP); Hisako Sugano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/363,715

(22) PCT Filed: Dec. 13, 2012

(86) PCT No.: PCT/JP2012/007974
§ 371 (c)(1),
(2) Date: Jun. 6, 2014

(87) PCT Pub. No.: WO2013/088725
PCT Pub. Date: Jun. 20, 2013

(65) Prior Publication Data
US 2014/0320383 A1 Oct. 30, 2014

(30) Foreign Application Priority Data
Dec. 16, 2011 (JP) .................................. 2011-275573

(51) Int. Cl.
*G02B 27/01* (2006.01)
*G06F 3/041* (2006.01)
(Continued)

(52) U.S. Cl.
CPC ............ *G02B 27/017* (2013.01); *G06F 3/011* (2013.01); *G06F 3/03547* (2013.01);
(Continued)

(58) Field of Classification Search
CPC .............. G02B 27/017; G02B 27/0172; G02B 2027/014; G02B 2027/0178;
(Continued)

(56) References Cited

U.S. PATENT DOCUMENTS 5,929,841 A * 7/1999 Fujii ..................... G06F 3/0346
345/473
6,037,937 A * 3/2000 Beaton .................. G06F 3/0485
715/764

(Continued)

FOREIGN PATENT DOCUMENTS

DE 103 49 673 5/2005
JP 2008-070817 3/2008
(Continued)

*Primary Examiner* — Dismery Mercedes
(74) *Attorney, Agent, or Firm* — Chip Law Group

(57) ABSTRACT

A head-mountable display device is provided including an image display device configured to be communicable with an input device and to display an operation image and an auxiliary image overlaid upon the operation image. The auxiliary image indicates three-dimensional positional information of a target object relative to an input operation surface of the input device.

20 Claims, 18 Drawing Sheets

(51) Int. Cl.
*G06F 3/0354* (2013.01)
*G06F 3/01* (2006.01)
*G06F 3/0484* (2013.01)
*G06F 3/0481* (2013.01)

(52) U.S. Cl.
CPC ............ *G06F 3/041* (2013.01); *G06F 3/0416* (2013.01); *G02B 2027/0178* (2013.01); *G02B 2027/0187* (2013.01); *G06F 3/04815* (2013.01); *G06F 3/04845* (2013.01)

(58) Field of Classification Search
CPC . G02B 2027/0138; G06F 3/017; G06F 3/011; G06F 3/012; G06F 3/041; G06F 3/0412; G06F 3/0482; G06F 3/04845; G06F 3/04842; G06F 3/048; G06F 2203/04803; G06T 19/006; G06T 19/024; G06T 2200/04; G06T 2215/16; G06T 2200/24; G06T 19/20
See application file for complete search history.

(56) References Cited

U.S. PATENT DOCUMENTS

| | | | |
|---|---|---|---|
| 7,880,726 B2* | 2/2011 | Nakadaira et al. | 345/173 |
| 8,217,856 B1* | 7/2012 | Petrou | G02B 27/017 345/8 |
| 8,872,762 B2* | 10/2014 | Galor | G06F 3/017 345/156 |
| 9,024,844 B2* | 5/2015 | Vaught | G06K 9/00604 345/158 |
| 2001/0043266 A1* | 11/2001 | Robinson | G02B 27/2264 348/53 |
| 2004/0027312 A1* | 2/2004 | Owada | G06F 1/1626 345/8 |
| 2005/0248529 A1* | 11/2005 | Endoh | G06F 3/011 345/156 |
| 2006/0214926 A1* | 9/2006 | Kolmykov-Zotov | G06F 3/04842 345/179 |
| 2008/0225007 A1* | 9/2008 | Nakadaira | G06F 3/03545 345/173 |
| 2009/0058829 A1* | 3/2009 | Kim | G06F 3/016 345/173 |
| 2009/0289914 A1* | 11/2009 | Cho | G06F 3/044 345/173 |
| 2010/0079356 A1* | 4/2010 | Hoellwarth | G02B 27/017 345/8 |
| 2010/0095206 A1* | 4/2010 | Kim | G06F 3/017 715/702 |
| 2010/0182340 A1* | 7/2010 | Bachelder | G02B 27/017 345/633 |
| 2010/0306710 A1* | 12/2010 | Poot | G06F 3/04812 715/856 |
| 2010/0315413 A1* | 12/2010 | Izadi | G06F 3/017 345/419 |
| 2011/0096033 A1* | 4/2011 | Ko | G06F 3/017 345/175 |
| 2011/0169928 A1* | 7/2011 | Gassel | H04N 13/044 348/53 |
| 2011/0210928 A1* | 9/2011 | Matsuda | G06F 3/04886 345/173 |
| 2011/0242037 A1* | 10/2011 | Gruber | G06F 3/0488 345/173 |
| 2011/0316679 A1* | 12/2011 | Pihlaja | G06F 3/0488 340/407.2 |
| 2012/0062558 A1* | 3/2012 | Lee | G06F 3/017 345/419 |
| 2012/0098744 A1* | 4/2012 | Stinson, III | G06F 3/0304 345/158 |
| 2012/0113095 A1* | 5/2012 | Hwang | G06F 3/04817 345/419 |
| 2012/0154277 A1* | 6/2012 | Bar-Zeev | G02B 27/017 345/158 |
| 2012/0223882 A1* | 9/2012 | Galor | G06F 3/017 345/157 |
| 2013/0009910 A1 | 1/2013 | Takano | |
| 2013/0106898 A1* | 5/2013 | Saint-Loubert-Bie | G06F 1/1626 345/592 |
| 2013/0114043 A1* | 5/2013 | Balan | H04N 13/044 351/210 |
| 2013/0162516 A1* | 6/2013 | Paretti | G06F 3/0488 345/156 |

FOREIGN PATENT DOCUMENTS

JP    2010-145861    7/2010
WO    2011/108650    9/2011

* cited by examiner

HEAD-MOUNTED DISPLAY FOR VISUALLY RECOGNIZING INPUT

CROSS REFERENCES TO RELATED APPLICATIONS

The present application is a national stage of International Application No. PCT/JP2012/007974 filed on Dec. 13, 2012 and claims priority to Japanese Patent Application No. 2011-275573 filed on Dec. 16, 2011, the disclosure of which is incorporated herein by reference.

BACKGROUND

The present technology relates to a head-mounted display and an information display apparatus.

A head-mounted display (HMD) that is mounted on the head of a user to be capable of presenting an image to the user through a display or the like located in front of the eyes is known. The HMDs are classified into a non-see-through HMD that transmits no external light therethrough and displays only a predetermined image to the user and a see-through HMD that allows the user to visually recognize the outside world and, for example, displays a predetermined image to be overlapped with the field of view of the user. For example, Japanese Patent Application Laid-open No. 2008-070817 describes a non-see-through HMD including an operation input part such as a button on an HMD main body.

On the other hand, in recent years, as an input method for an information processing apparatus and the like, instead of a button and the like having a large occupied area and a limited diversification, a touch panel method that is capable of switching indicated items (graphical user interfaces (GUIs)), to thereby present the plurality of GUIs to the user is becoming the mainstream. In this context, Japanese Patent Application Laid-open No. 2010-145861 (hereinafter, referred to as PTL 2) describes a see-through HMD in which an input operation is made with an input operation surface of a touch panel being located within a field of view of the user.

CITATION LIST

Patent Literature

[PTL 1]
Japanese Patent Application Laid-open No. 2008-070817
[PTL 2]
Japanese Patent Application Laid-open No. 2010-145861

SUMMARY

However, in the see-through HMD described in PTL 2, it is necessary to locate the input operation surface of the touch panel within the field of view through the HMD for use, and hence a contradiction between an input operation and a display on a screen is likely to occur, which causes a problem of operability.

In view of the above-mentioned circumstances, there is a need for providing a head-mounted display and an information display apparatus that match the intuition of a user and have excellent operability.

According to an embodiment, a head-mountable display device is provided including an image display device configured to be communicable with an input device and to display an operation image and an auxiliary image overlaid upon the operation image. In this embodiment, the auxiliary image indicates three-dimensional positional information of a target object relative to an input operation surface of the input device. According to another embodiment, a method of displaying an image on a head-mountable display device is provided. The method includes receiving, by an image display device of the head-mountable display device, three-dimensional positional information of a target object relative to an input device, and includes displaying on the image display device an operation image and an auxiliary image overlaid upon the operation image. In this embodiment, the auxiliary image indicates the three-dimensional positional information of the target object relative to an input operation surface of the input device.

In another embodiment, an information display system is provided including a head-mountable display device including an image display device that is configured to display a primary image and an auxiliary image overlaid upon the primary image. The information display system also includes an input device configured to measure three-dimensional positional information of a target object relative to an input operation surface of the input device. In this embodiment, the auxiliary image represents the three-dimensional positional information of the target object.

By wearing the head-mounted display (HMD), the user can visually recognize the information on the relative position of the detection target such as a finger that comes close to the input operation surface by the use of the auxiliary image in the operation image presented by the HMD. Accordingly, it becomes possible for the user to make an operation that matches intuition while viewing the operation image displayed by the HMD without checking the input operation surface.

In the head-mounted display, the receiver may be configured to further receive an image signal outputted from the input device, and the display processor may be configured to cause, based on the image signal, the image display element to display the image.

In the HMD having such a configuration, not only a dedicated input device but also, for example, a portable terminal equipped with a touch panel can be used as the input device. Accordingly, it becomes possible for the HMD to use various applications and the like of the portable terminal and the like.

The display processor is configured to move, based on the operation signal, the auxiliary image in a display area of the image.

Accordingly, the user can check the relative position over time of the detection target that is held in contact with the input operation surface by the use of the operation image. It becomes possible to further enhance the operability.

Further, the operation signal may contain information on a proximity distance of the detection target to the input operation surface, and the display processor may be configured to change, depending on the proximity distance of the detection target to the input operation surface, a display mode of the auxiliary image.

Accordingly, for example, the HMD can reflect to the operation image a change in height position from the user's input operation surface. Accordingly, it is possible to know an operation position with respect to the input operation surface while viewing the operation image, and hence touch input operability to an absolute position is enhanced and a user-friendly and intuitive input operation is achieved.

The head-mounted display may further include an arithmetic unit configured to calculate, based on the operation signal, a coordinate position of the detection target on the input operation surface. The display processor may be configured to cause the image display element to display the operation image based on the coordinate position of the detection target that is calculated by the arithmetic unit.

The head-mounted display is allowed to process a signal detected by the input device and to be applicable also to an input device having a simple apparatus configuration.

According to another embodiment of the present technology, there is provided an information display apparatus, including: an input device and a head-mounted display.

The input device includes an input operation surface, and a sensor unit configured to detect proximity of a detection target to the input operation surface and to output information on a coordinate position of the detection target on the input operation surface.

The head-mounted display includes an image display element configured to form an image to be presented to a user, and a display processor configured to cause the image display element to form, based on an output of the sensor unit, an operation image in which an auxiliary image showing a position of the detection target is overlapped on the image.

With the information display apparatus, the head-mounted display is capable of presenting to the user the image based on the input operation on the input device. Thus, it becomes possible for the user to make an operation that matches intuition without checking the input operation surface.

According to still another embodiment of the present technology, there is provided an information display apparatus, including: an input device and a head-mounted display.

The input device includes an input operation surface, and a sensor unit configured to detect proximity of a detection target to the input operation surface.

The head-mounted display includes an image display element configured to form an image to be presented to a user, an arithmetic unit configured to calculate, based on an output of the sensor unit, a coordinate position of the detection target on the input operation surface, and a display processor configured to cause the image display element to form, based on the coordinate position of the detection target that is calculated by the arithmetic unit, an operation image in which an auxiliary image showing a position of the detection target is overlapped on the image.

With this information display apparatus, it is possible to simplify the configuration of the input device. Accordingly, it is possible to reduce the weight of the input device and to provide the information display apparatus that reduces fatigue even during a prolonged operation.

As described above, according to the present technology, it becomes possible to provide a head-mounted display and an information display apparatus that match the intuition of a user and have excellent operability.

Additional features and advantages are described herein, and will be apparent from the following Detailed Description and the figures.

BRIEF DESCRIPTION OF THE FIGURES

FIG. 6 are views each explaining a typical operation example of the information display apparatus according to the first embodiment of the present technology, in which

FIG. 9 are views each explaining a typical operation example of an information display apparatus according to the second embodiment of the present technology, in which

DETAILED DESCRIPTION

Hereinafter, embodiments according to the present technology will be described with reference to the drawings.

First Embodiment

Information Display Apparatus

Figure 1:
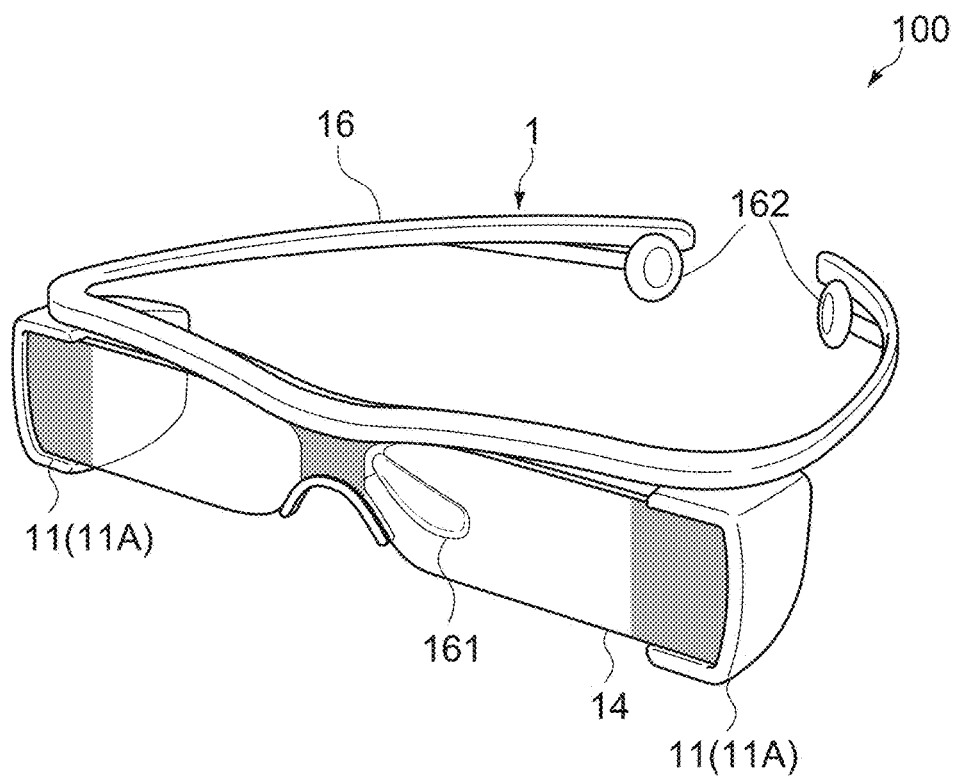
FIG. 1 is a schematic perspective view showing an information display apparatus according to a first embodiment of the present technology.
Figure 1:
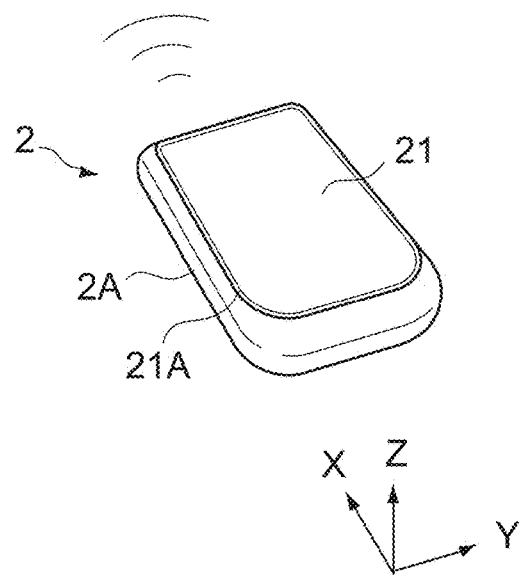

FIG. 1 is a schematic perspective view showing an information display apparatus according to an embodiment of the present technology. The information display apparatus 100 according to this embodiment includes a head-mounted display (HMD) 1 and an input device 2.

The HMD 1 is configured as a see-through HMD in this embodiment. The HMD 1 has a glasses-like shape as a whole. The HMD 1 is configured to allow a user putting the HMD 1 on his head to visually recognize the outside world and to be capable of presenting to the user an image based on information outputted from the input device 2.

The input device 2 is communicably connected to the HMD 1 in a wireless manner. Alternatively, the input device 2 may be configured to be communicable to the HMD 1 in a wired manner, for example, with a cable. In this embodiment, the input device 2 is constituted of, for example, a portable terminal equipped with a touch panel and configured to be connectable also to the Internet and the like. Alternatively, the input device 2 may function as a so-called remote controller of the HMD 1 and may be configured to be capable of making input operations relating to various settings and the like of the HMD 1.

Hereinafter, the input device 2 and the HMD 1 will be described.

[Input Device]

The input device 2 includes, for example, a casing 2A having a size that the user can hold it. The casing 2A is almost cuboid having a longitudinal direction in an X-axis direction, a lateral direction in a Y-axis direction, and a thickness direction in a Z-axis direction. An input operation surface 21 is formed in one surface of the casing 2A. The input operation surface 21 belongs to a two-dimensional coordinate system having coordinate axes in an X-axis and a Y-axis orthogonal to the X-axis. The input operation surface 21 has a rectangular shape perpendicular to a Z-axis, having long sides parallel to the X-axis direction and short sides parallel to the Y-axis direction.

The input device 2 has a function of considering, for example, a finger of the user as a detection target and detecting an xy-coordinate position of the finger that touches the input operation surface 21 and a change of the xy-coordinate position. The input device 2 also has a function of detecting proximity of the finger with respect to the input operation surface 21 and outputs information on a height position of the finger from the input operation surface 21. Accordingly, in addition to a moving direction, a moving speed, an amount of movement, and the like of the finger on the input operation surface 21, a spaced distance of the finger from the input operation surface 21 is obtained. It should be noted that the detection target is not limited to the finger of the user and the detection target may be a stylus or the like.

In this embodiment, the input operation surface 21 is constituted of a light-transmissive display cover or the like. An input operation by the detection target is made on the input operation surface 21 and the input operation surface 21 also has a function as a screen for displaying an image. The input operation surface 21 is provided, for example, to cover an opening portion 21A formed in a surface of the casing 2A. A rim of the input operation surface 21 is fixed to the casing 2A. Further, the material, thickness, and size, and the like of the input operation surface 21 are set so that the input operation surface 21 can be deflected and deformed due to a contact pressure above a predetermined level. Examples of the material constituting the input operation surface 21 include a transparent plastic plate, a glass plate, and a ceramic plate made of an acrylic resin, a polycarbonate resin, and a polyethylene terephthalate (PET).

Figure 2:
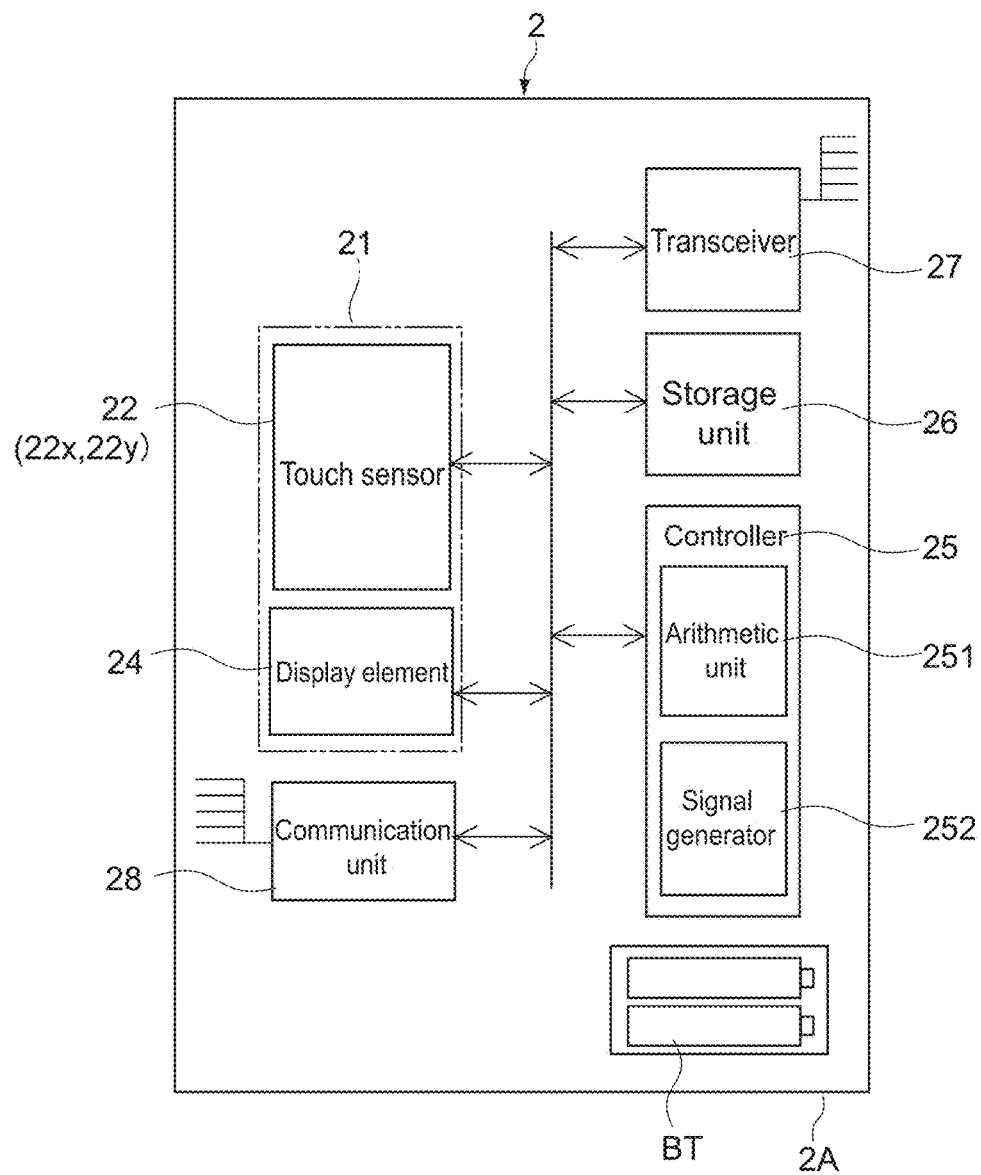
FIG. 2 is a block diagram showing an internal configuration of an input device according to the first embodiment of the present technology.

FIG. 2 is a block diagram showing an internal configuration of the input device 2. The input device 2 includes the casing 2A, the input operation surface 21, a touch sensor 22, a display element 24, a controller 25, a storage unit 26, a transceiver 27, a communication unit 28, and a battery BT. The touch sensor 22 constitutes a "sensor unit" in this embodiment.

The touch sensor 22 has a panel shape having almost the same shape and size as the input operation surface 21. The touch sensor 22 is provided directly beneath the input operation surface 21 to detect the detection target (finger) that is held in contact with the input operation surface 21. The touch sensor 22 detects the coordinate position corresponding to the movement in an xy-plane of the detection target on the input operation surface 21 and outputs a detection signal corresponding to the coordinate position.

In this embodiment, for the touch sensor 22, a capacitance type touch panel that is capable of electrostatically detecting the detection target that is held in contact with the input operation surface 21 is used. The capacitance type touch panel may be a projected capacitive type touch panel or may be a surface capacitive type touch panel. The touch sensor 22 of this kind typically includes a first sensor electrode $22x$ for x-position detection, in which a plurality of first wirings parallel to the y-axis direction are arranged in the x-axis direction, and a second sensor electrode $22y$ for Y-position detection, in which a plurality of second wirings parallel to the x-axis direction are arranged in the y-axis direction. The first and second sensor electrodes $22x$ and $22y$ are provided to be opposed to each other in the z-axis direction. In the touch sensor 22, by, for example, a driver circuit of the controller 25 to be described later, a signal current is successively supplied to the first and second wirings.

The touch sensor 22 is not particularly limited as long as it is a sensor capable of detecting the coordinate position of the detection target. In addition to those described above, various types of sensors such as a resistive film sensor, an infrared sensor, an ultrasonic sensor, a surface acoustic wave sensor, an acoustic pulse recognition sensor, and an infrared image sensor are applicable.

The display element 24 is provided directly beneath the input operation surface 21 and the touch sensor 22. The display element 24 in this embodiment is not particularly limited and a liquid-crystal display, an organic EL display, or the like may be used. Accordingly, it becomes possible to display an image of a character, a pattern, or the like on the input operation surface 21.

The controller 25 is constituted of, typically, a central processing unit (CPU) or a micro-processing unit (MPU). In this embodiment, the controller 25 includes an arithmetic unit 251 and a signal generator 252 and executes various functions according to programs stored on the storage unit 26. The arithmetic unit 251 executes predetermined arithmetic processing on an electrical signal outputted from the touch sensor 22 to generate an operation signal containing information on a relative position of the detection target that comes close to the input operation surface 21. Based on the arithmetic result, the signal generator 252 generates an image signal for causing the display element 24 to display an image. The controller 25 includes the driver circuit for driving the touch sensor 22. The driver circuit is incorporated into the arithmetic unit 251 in this embodiment.

Specifically, based on a signal outputted from the touch sensor 22, the arithmetic unit 251 calculates an xy-coordinate position of the finger on the input operation surface 21 and a height position (proximity distance) of the finger from the input operation surface 21. Further, based on the calculation result, the arithmetic unit 251 detects, for example, that the detection target is located in a predetermined xy-coordinate position. Moreover, when detecting a touch of the finger to the input operation surface 21 in the coordinate position (most-proximate distance of finger with respect to input operation surface 21), the arithmetic unit 251 executes predetermined processing assigned to a GUI corresponding to the coordinate position. The processing result by the arithmetic unit 251 is transmitted to the signal generator 252.

In this embodiment, for example, by a detection method called a self-capacitance method, capacitances of the sensor electrodes $22x$ and $22y$ are individually detected. The self-capacitance method is also called single-electrode method, in which a single electrode is used for sensing. The electrode for sensing has a floating capacitance with respect to a ground potential. When a grounded detection target such as a human body (finger) comes close to the electrode, the floating capacitance of the electrode increases. By detecting the increase in capacitance, the arithmetic unit 251 calculates the proximity distance of the finger with respect to the input operation surface 21 and position coordinates of the finger on the input operation surface 21. The arithmetic unit 251 determines contact (touch) of the finger with respect to the input operation surface 21 when the amount of increase in capacitance becomes equal to or larger than a predetermined threshold.

Figure 3:
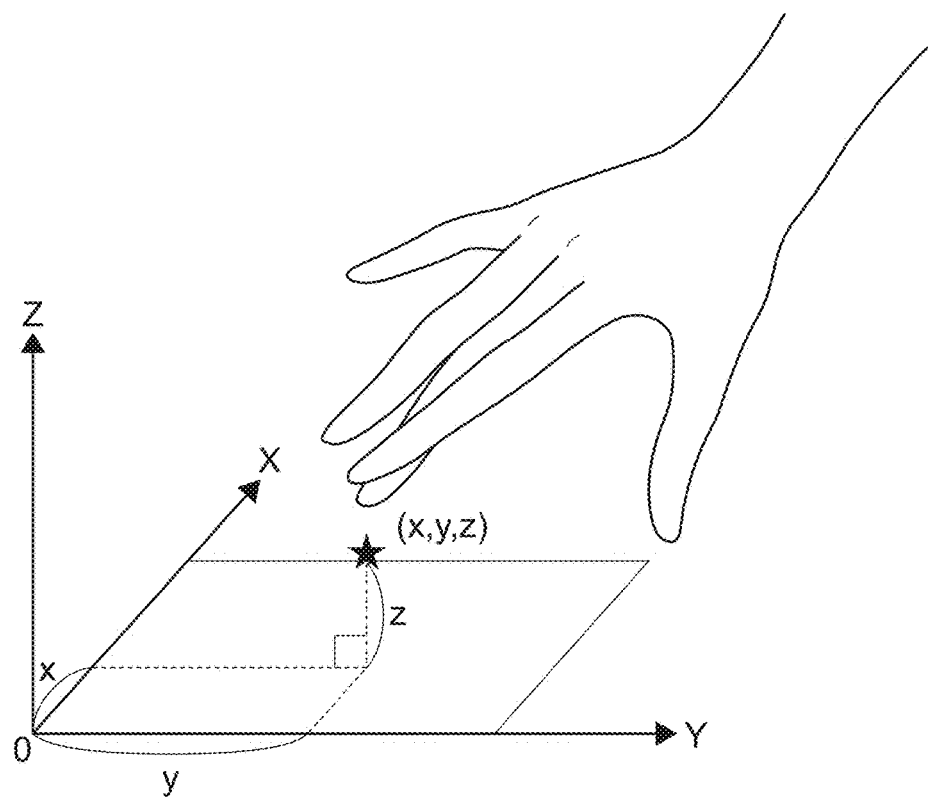
FIG. 3 is a view explaining a coordinate position of a detection target that operates the input device.

Here, the position of the finger opposed to the input operation surface 21 is defined as such a point that a distance between the finger that makes an operation and the input operation surface 21 is minimum. FIG. 3 shows an XYZ-space assuming that the input operation surface (touch panel surface) 21 that is detectable in a non-contact manner is an XY-plane and a user side in a perpendicular direction from the XY-plane is +Z. In this embodiment, in a finger-position-detection enabled area of the touch panel (only when $Z \geq 0$ is established), such a point that a distance between the hand that makes an operation (including both of one-handed operation and two handed operation) and the touch panel becomes minimum is defined as a finger position (x, y, z). A z-coordinate corresponds to the proximity distance of the finger to the input operation surface 21. The arithmetic unit 251 determines that z=0 is established when the amount of increase in capacitance of the touch sensor 22 becomes equal to or larger than the predetermined threshold of the amount of increase in capacitance.

Based on the processing result transmitted from the arithmetic unit 251, the signal generator 252 generates an image signal for forming a display image to be displayed by the display element 24. At this time, the signal generator 252 may also generate a signal for displaying an auxiliary image such as a pointer in a position of an image on the input operation surface 21, the position corresponding to the xy-coordinate position of the detection target. Further, the signal generator 252 may also generate a signal for changing a display mode of the auxiliary image depending on a contact pressure of the detection target.

The operation signal relating to the xy-coordinate position and the proximity distance of the finger that are calculated by the arithmetic unit 251 of the controller 25 and the image signal generated by the signal generator 252 are transmitted to the HMD 1 through the transceiver 27. Further, although not shown, the input device 2 includes an A/D converter that converts a detection signal (analog signal) outputted from the touch sensor 22 into a digital signal and a D/A converter that converts a digital signal into an analog signal.

The storage unit 26 is constituted of a random access memory (RAM), a read only memory (ROM), another semiconductor memory, and the like and stores programs and the like to be used for various arithmetic operations by the controller 25. For example, the ROM is constituted of a non-volatile memory and stores programs and setting values for causing the controller 25 to execute arithmetic processing such as calculation of the xy-coordinate position and the proximity distance of the detection target. Further, for example, a non-volatile semiconductor memory allows the storage unit 26 to store the xy-coordinate position and the proximity distance of the detection target and programs and the like for executing functions each corresponding to the xy-coordinate position and the proximity distance. In addition, the programs stored on the semiconductor memory and the like in advance may be set to be loaded into the RAM and executed by the arithmetic unit 251 of the controller 25.

The transceiver 27 is configured to be capable of transmitting various control signals generated by the controller 25 to the HMD 1, for example, in a wireless manner. Further, the transceiver 27 is configured to be capable of receiving a predetermined signal transmitted from the HMD 1. On the other hand, the communication unit 28 is connected to a communication network such as the Internet. The communication unit 28 is used, for example, to download a predetermined program such as an application into the input device 2. Transmission and reception of information in the communication unit 28 may be performed in a wired manner using a LAN cable or the like or may be performed in a wireless manner, for example, in high-speed data communication.

The battery BT constitutes a power supply of the input device 2 and supplies a necessary electric power to each section within the casing 2A. The battery BT is a primary cell or secondary cell. Further, the battery BT may be constituted of a solar cell. In addition, the input device 2 may further include an external switch (not shown) that controls activation or the like of the input device 2 due to pressing.

The input device 2 may be configured as an apparatus dedicated to the information display apparatus 100. Alternatively, the input device 2 may be configured as a stand-alone electronic apparatus such as a portable apparatus. Accordingly, even when the input device 2 is not connected to the HMD 1, the input device 2 can be used as an information display terminal equipped with a touch display independently of the HMD 1.

[HMD]

The HMD 1 is a see-through HMD and configured to present a predetermined image in a field of view of a user while allowing the user to visually recognize the outer world. The HMD 1 according to this embodiment includes image display apparatuses 11 and a support portion 16 and has a glasses-like shape as a whole. For example, by employing the see-through HMD as the HMD 1, the user is allowed to visually recognize the outer world even when he is operating the input device 2, which achieves an improvement in safety during an operation.

The support portion 16 can be mounted on the head of the user. During mounting, the image display element 14 to be described later is configured to be supported in front of the eyes of the user. Although the shape of the support portion 16 is not particularly limited, the shape of the support portion 16 may be the glasses-like shape as a whole in this embodiment. The support portion 16 has, for example, a temple structure capable of being worn on the left and right ears of the user. For example, nose pads 161 may be attached near a bridge of the support portion 16. Further, earphones 162 may be provided to the support portion 16. Examples of material constituting the support portion 16 include, although not particularly limited, a metal, an alloy, and a plastic.

The image display apparatuses 11 include casings 11A and are provided, for example, in predetermined positions of the support portion 16. The arrangement of the image display apparatuses 11 is not particularly limited. For example, the image display apparatuses 11 are provided outside the left and right eyes of the user such that the casings 11A are not included in the field of view.

Figure 4:
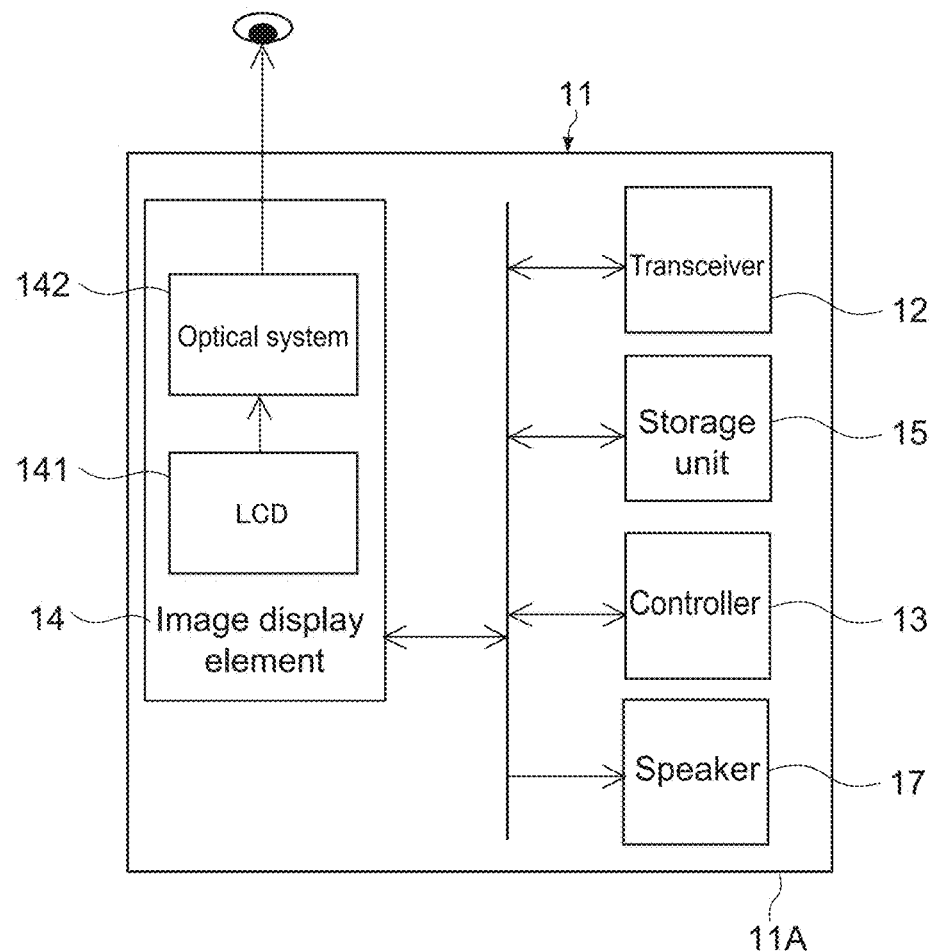
FIG. 4 is a block diagram showing an internal configuration of a head-mounted display (HMD) according to the first embodiment of the present technology.

FIG. 4 is a block diagram showing an internal configuration of each of the image display apparatuses 11. The image display apparatus 11 includes, in this embodiment, the casing 11A, a transceiver (receiver) 12, a controller 13, an image display element 14, and a storage unit 15. In this embodiment, the controller 13 constitutes a "display processor."

The transceiver 12 receives from the transceiver 27 of the input device 2, the operation signal containing the information on the relative position (xy-coordinate position and proximity distance) of the detection target that comes close to the input operation surface 21. In addition, the transceiver 12 may also receive the image signal of the display image to be displayed on the input operation surface 21 of the input device 2. A method of transmitting those signals is not particularly limited. For example, as a wireless communication, a communication between apparatuses, such as "Wi Fi" (registered trademark), "ZigBee" (registered trademark), and "Bluetooth" (registered trademark) or a communication over the Internet may be used. Alternatively, a wired communication via, for example, a universal serial bus (USB) or a high-definition multimedia interface (HDMI) may be used.

The controller 13 is typically constituted of a CPU or an MPU and executes various functions according to programs stored on the storage unit 15. In this embodiment, based on the operation signal and the image signal that are received by the transceiver 12, the controller 13 generates a control signal for causing the image display element 14 to form an image to be presented to the user. Accordingly, it becomes possible to cause the image display element 14 to display an operation image in which, for example, the auxiliary image showing the position of the detection target is overlapped on the same image as the display image displayed the input operation surface 21. The shape of the auxiliary image is not particularly limited and the auxiliary image is constituted of, for example, an annular (ring shaped) pointer or an area having a luminance or color saturation changed.

The image obtained by removing the auxiliary image from the operation image is typically equivalent to the display image on the input operation surface 21. Thus, consistency and unity of the input operations by both of the HMD 1 and the input device 2 are enhanced. Here, "equivalent" means to be substantially the same. It is unnecessary for the image obtained by removing the auxiliary image from the operation image to be precisely identical to the display image on the input operation surface 21 in display luminance, display size, aspect ratio, and the like. Therefore, such an image includes, in addition to the image identical to the display image on the input operation surface 21, for example, an image similar to the display image (enlarged or size-reduced image of the display image) and a distorted image in comparison with the display image. In addition, as the image to be displayed by the HMD 1, in addition to the display image of the input device 2 and the auxiliary image, other images may be displayed concurrently or selectively.

In this embodiment, the image display element 14 includes a liquid-crystal element (LCD) 141 and an optical system 142 and is configured to present an image formed by the LCD 141 to the user through the optical system 142. The image display element 14 is configured to be capable of increasing or decreasing the size of the image to be presented to the user to be an arbitrary size by an input operation by the input device 2 or an input operation by a suitable input apparatus provided to the HMD 1.

In the LCD 141, a plurality of pixels are arranged in a matrix form. The LCD 141 modulates light incident from a light source (not shown) constituted of light-emitting diodes (LEDs) or the like according to the control signal generated by the controller 13 for each pixel and outputs light for forming the image to be presented to the user. The LCD 141 may use a single-plate system concurrently outputting image light beams corresponding to R (red), G (green), and B (blue) colors, for example, or three-plate system outputting each of the image light beams corresponding to those colors.

The optical system 142 is configured to be capable of deviating light outputted from the LCD 141 and guiding it to the eye of the user. The optical system 142 may be constituted of, for example, a light guide plate that is constituted of a transparent substrate capable of guiding light by total reflection and a reflection volume holographic grating that allows diffraction reflection. The light guide plate is formed in, for example, a rectangular or circular flat plate shape or the like and is provided in front of the eye of the user like a lens of glasses. The reflection volume holographic grating or the like is suitably provided in the light guide plate and is produced to be capable of reflecting light outputted from the LCD 141 to guide it to the eye of the user. Further, other than the holographic grating, for example, a reflective plate or the like may be employed.

By reflecting light outputted from the LCD 141 on a predetermined position, it becomes possible for the thus configured optical system 142 to present the operation image in the field of view of the user. Further, when the light guide plate is formed of a transparent substrate, it becomes possible to present the operation image in the field of view in an overlapping manner while allowing the user to visually recognize the outer world.

The storage unit 15 is constituted of a RAM, a ROM, another semiconductor memory, and the like and stores programs and the like to be used for various arithmetic operations by the controller 13.

A speaker 17 converts an electrical audio signal transmitted from the input device 2 or generated by the controller 13 or the like into a physical vibration to provide the user with an audio through the earphones 162. It should be noted that the configuration of the speaker 17 is not particularly limited.

It should be noted that the present technology is not limited to the configuration in which the two image display apparatuses 11 are provided corresponding to both eyes. For example, a configuration in which a single image display apparatus 11 may be provided corresponding to only one of the left and right eyes is also possible.

[Operation Example of Information Display Apparatus]

Next, a basic operation example of the information display apparatus 100 will be described.

Figure 5:
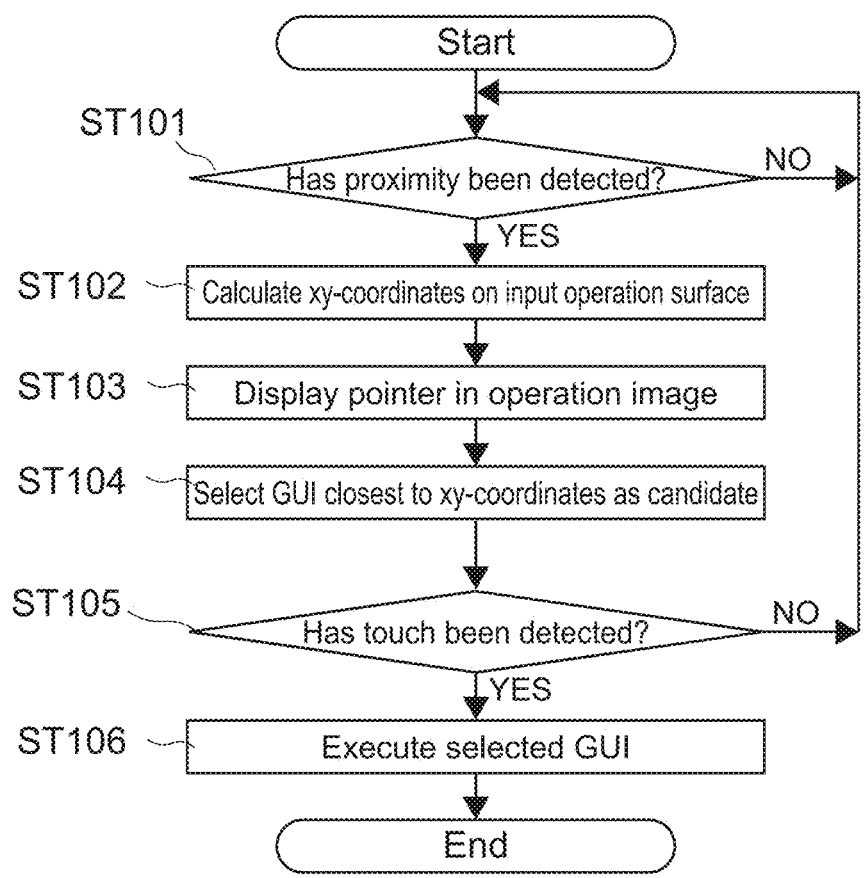
FIG. 5 is a flowchart in an operation example of the information display apparatus according to the first embodiment of the present technology.
Figure 6A:
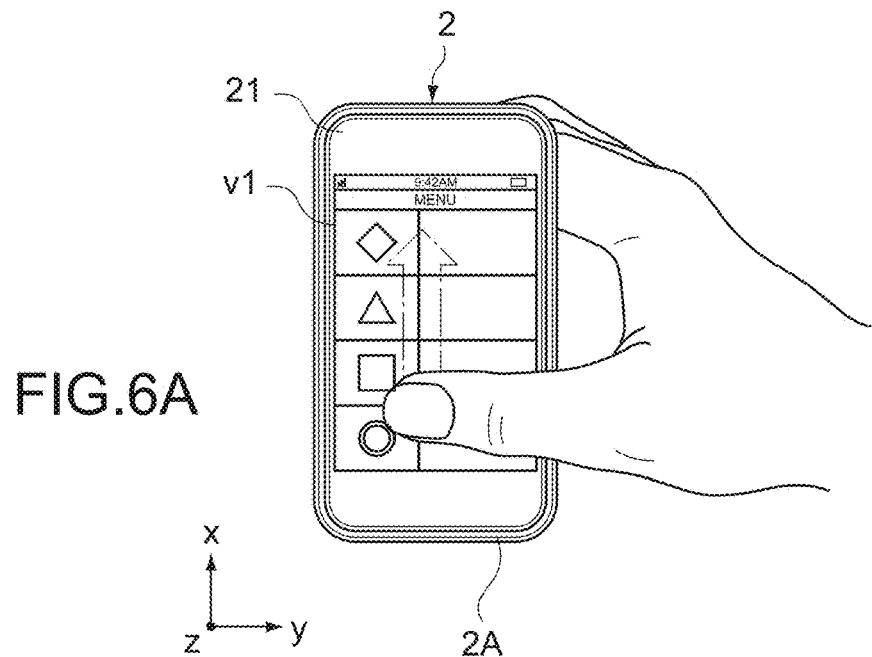
FIG. 6A shows an input operation surface of an input device on which a user makes an input operation and FIG. 6B shows an operation screen presented to the user through the HMD.
Figure 6B:
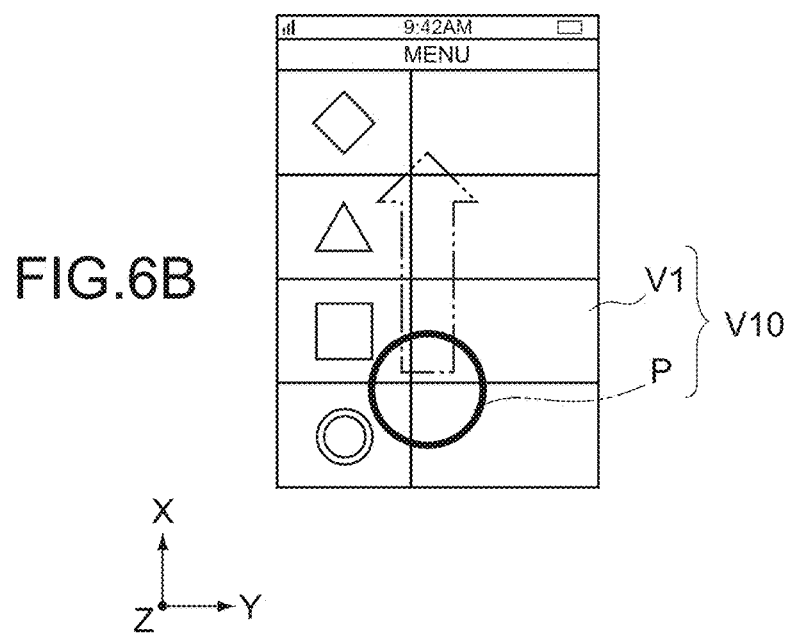

FIG. 5 is a flowchart in an operation example of the HMD 1 (controller 13) and the input device 2 (controller 25). FIG. 6 are views each explaining a typical operation example of the information display apparatus 100, in which FIG. 6A shows the input operation surface 21 of the input device 2 on which a user makes an input operation and FIG. 6B shows an operation screen presented to the user through the HMD 1. The X-axis direction and the Y-axis direction in the figures correspond to the X-axis direction and the Y-axis direction of the input operation surface 21, respectively. The Z-axis direction in the figures corresponds to the Z-axis direction of the input operation surface 21.

On the input operation surface 21 of the activated input device 2, an image v1 (display image) in which, for example, a plurality of GUIs are displayed is displayed (FIG. 6A). For example, the image v1 is a screen for selecting various applications and each of the GUIs is an icon applied to each of the applications.

At this time, an image V1 similar to the image v1 is presented also to the user wearing the HMD 1 that is connected to the input device 2 and activated, in the field of view through the HMD 1.

Using the touch sensor 22, the input device 2 determines whether or not proximity of the finger (detection target) of the user on the input operation surface 21 has been detected (Step ST101). When the proximity has been detected (YES in Step ST101), the touch sensor 22 outputs to the controller 25 detection signals relating to the xy-coordinate position on the input operation surface 21 to which the finger has come close and the proximity distance of the finger.

Based on the detection signal, the arithmetic unit 251 of the controller 25 calculates the xy-coordinate position of the finger that comes close to the input operation surface 21 and the proximity distance thereof (Step ST102). The signal relating to the xy-coordinate position that is calculated by the arithmetic unit 251 is outputted to the transceiver 27.

The transceiver 27 transmits the operation signals on the xy-coordinate position and the proximity distance to the transceiver 12 of the HMD 1.

Based on the operation signal and the image signal that are received by the transceiver 12, the controller 13 of the HMD 1 generates a signal for controlling an operation image V10 in which the auxiliary image (pointer P) showing a position of the detection target is overlapped on the image V1. The image display element 14 to which the control signal is outputted presents the operation image V10 to the user (Step ST103 and FIG. 6B). Accordingly, it becomes possible for the user to perform a desired operation by checking the movement of the pointer P in the operation image V10 presented by the HMD 1 without viewing the input operation surface 21 held in the hand of the user. It becomes possible to make an operation that matches the intuition of the user. It should be noted that, at this time, the image to be displayed on the input operation surface 21 may be only the image v1 or may be an image in which a pointer or the like is overlapped on the image v1.

Further, when the finger of the user moves on the input operation surface 21 (see arrows in FIGS. 6A and 6B), information on the xy-coordinate position that changes over time is obtained by the touch sensor 22. This information is processed as the operation signal by the controller 25 of the input device 2 and is outputted to the controller 13 of the HMD 1 via the transceivers 27 and 12. Accordingly, based on the operation signal, the controller 13 can output to the LCD 141 the control signal for moving the pointer P. Based on the movement of the finger of the user, it becomes possible to move the pointer P in a display area of the image V1.

The controller 25 of the input device 2 selects a GUI (hereinafter, referred to as selection GUI) that is the closest to the calculated xy-coordinate position as a selection candidate (Step ST104). Correspondingly, GUIs being selection candidates of the images v1 and V10 to be displayed on the input operation surface 21 and the HMD 1 may be, for example, changed in display mode such as a frame color. Further, it becomes possible for the user to check the GUIs as the selection candidates by visually recognizing the image V10 displayed by the HMD 1.

The controller 25 determines, over time, proximity or contact state between the finger and the input operation surface 21 (Steps ST101 to ST105). Here, when the user moves the finger away from the input operation surface 21 by a predetermined distance or more, the touch sensor 22 outputs a signal associated with non-proximity of the finger. Based on the output of the touch sensor 22, the controller 25 determines non-contact between the input operation surface 21 and the finger (NO in Step ST105).

On the other hand, when the user touches the input operation surface 21, the touch sensor 22 outputs a signal associated with contact of the finger. Based on the output of the touch sensor 22, the controller 25 determines that the finger of the user is held in contact with the input operation surface 21 (YES in Step ST105).

The selection candidate GUI is selected (determined) by a touch operation of the user with respect to a display position of the selection candidate GUI on the input operation surface 21. Based on the output of the touch sensor 22, the controller 25 determines, in the arithmetic unit 251, whether or not the touch operation has been made. Here, whether or not the touch operation has been made is determined based on the amount of change in capacitance outputted from the touch sensor 22 is equal to or larger than the predetermined threshold. When the finger is held in contact with the input operation surface 21 (YES in Step ST105), the controller 25 determines that the GUI as the selection candidate is the selection GUI, and executes a program corresponding to this selection GUI that is stored on the storage unit 26 (Step ST106). An activated application image and a web image (moving image and still image) are displayed not only on the input operation surface 21 but also in the field of view of the HMD 1.

On the other hand, when the calculated proximity distance is smaller than the predetermined threshold (NO in Step ST105), the controller 25 determines that the selection candidate GUI has not been selected. In this case, the controller 25 returns to Step ST101 and repeats the above-mentioned processing.

In recent years, so-called absolute-position touch input operation type portable apparatuses that each input information by directly touching an object (menu, operation icon, and the like) displayed on a touch display with the finger are widely used. With such a portable apparatus, it is necessary for the user to stare at the screen of the portable apparatus and the finger position during an input operation by its nature. Therefore, there are problems in that users who make operations while walking are likely to fail to pay attention what is in front of them and to have stiff neck and arms in prolonged use. Further, due to a limitation of the size of a video display area, that is, the size of the portable apparatus, there may be difficulty in viewing the display because it is small. In addition, there is also a problem in that the finger hides the display during an input operation.

On the other hand, an input operation in the traditional head-mounted display (HMD) is performed often by an old-fashioned input apparatus such as a cross key, a track ball, or a touch pad and is therefore inferior to the absolute-position input operation in intuitiveness and operability. Further, also due to the problem of its input operability, there is few interactive applications for the traditional HMD and the use of the traditional HMD is limited to constantly and unilaterally displaying a video or an image (television footage, video footage, slide show, etc.).

Here, as long as the same absolute-position touch input operation as that described above can be realized when the screen of the portable apparatus equipped with the touch display is displayed in the field of view of the HMD, it becomes possible to comfortably use traditional rich applications of the apparatus equipped with the touch display in a large screen without viewing the hand and the like. However, only displaying the screen of the portable apparatus equipped with the touch display in the field of view of the HMD makes operations difficult because the user loses a relative position between the finger and the screen when moving the finger away from the screen. On the other hand, in the case where a dedicated input apparatus represented by the old-fashioned input apparatus is used to allow an operation without viewing the screen, it is necessary to modify traditional applications that has been already optimized for the absolute-position touch input operation or to create new applications.

In contrast, in the HMD 1 or the information display apparatus 100 according to this embodiment, the operation image V10 in which the auxiliary image (pointer P) showing the position of the finger is overlapped on the image v1 displayed on the input operation surface 21 is configured to be displayed in the field of view of the HMD 1. Accordingly, it becomes possible for the user to make a predetermined operation by checking the movement of the pointer P in the operation image V10 presented by the HMD 1 without viewing the input operation surface 21 held in the hand. Further, even when the finger is released from the input operation surface 21, the coordinate position of the finger is displayed in the operation image V10, and hence an absolute-position touch input operation that is intuitive and has good operability becomes possible.

Further, according to this embodiment, the HMD 1 is capable of displaying the operation image V10 in an arbitrary size, and hence it is possible to provide a user-friendly use environment using a large screen that meets user's desire. In addition, the finger does not hide the screen displayed by the HMD 1 and it becomes possible to prevent an erroneous operation and lowering in visibility.

In addition, according to this embodiment, the see-through head-mounted display is employed as the HMD 1, and hence it is possible to operate the input device 2 while ensuring the field of view in front of the user.

Second Embodiment

Figure 7:
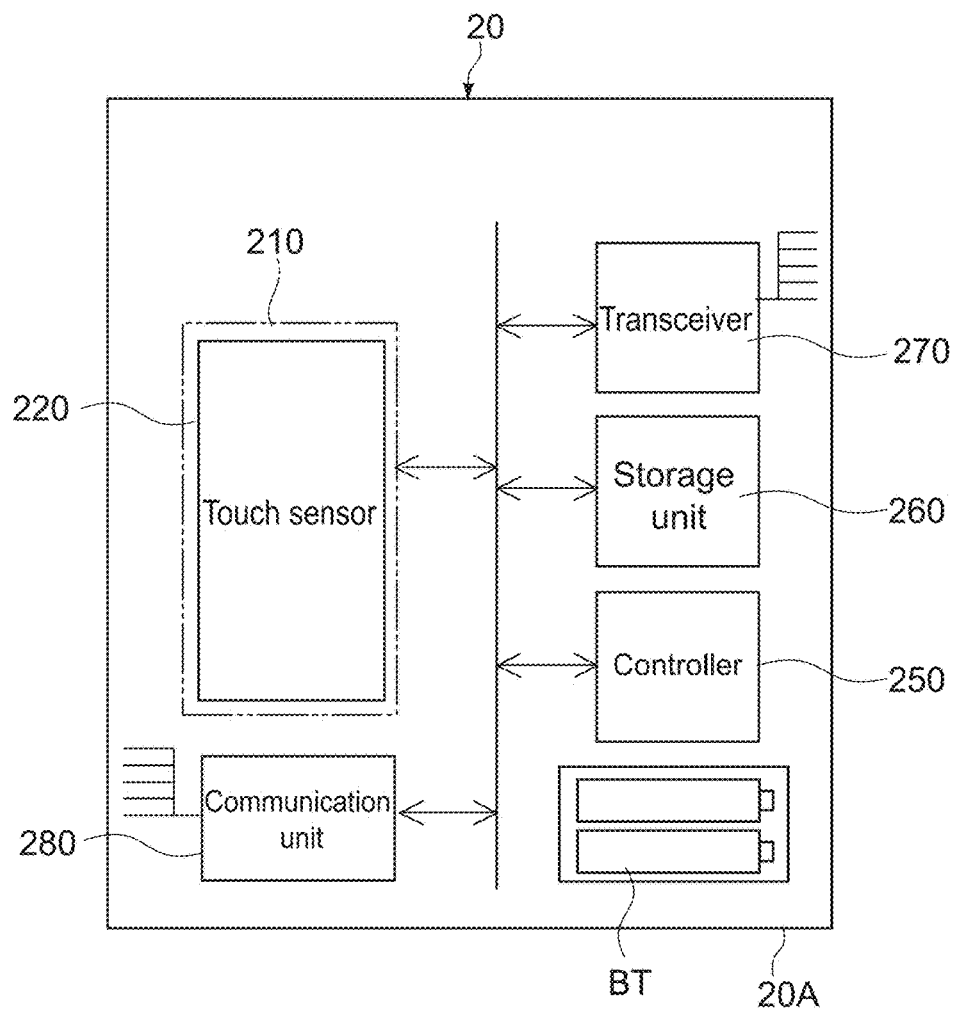
FIG. 7 is a block diagram showing an internal configuration of an input device according to a second embodiment of the present technology.
Figure 8:
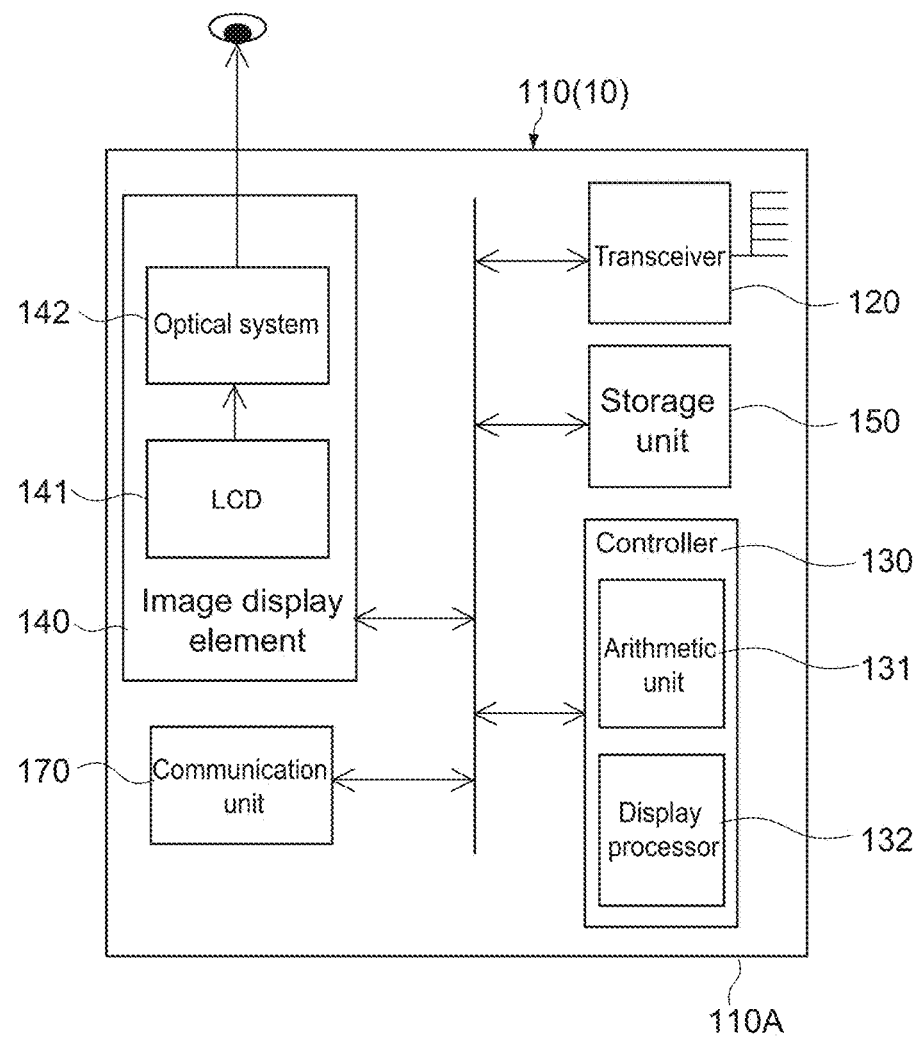
FIG. 8 is a block diagram showing an internal configuration of an HMD according to the second embodiment of the present technology.
Figure 9A:
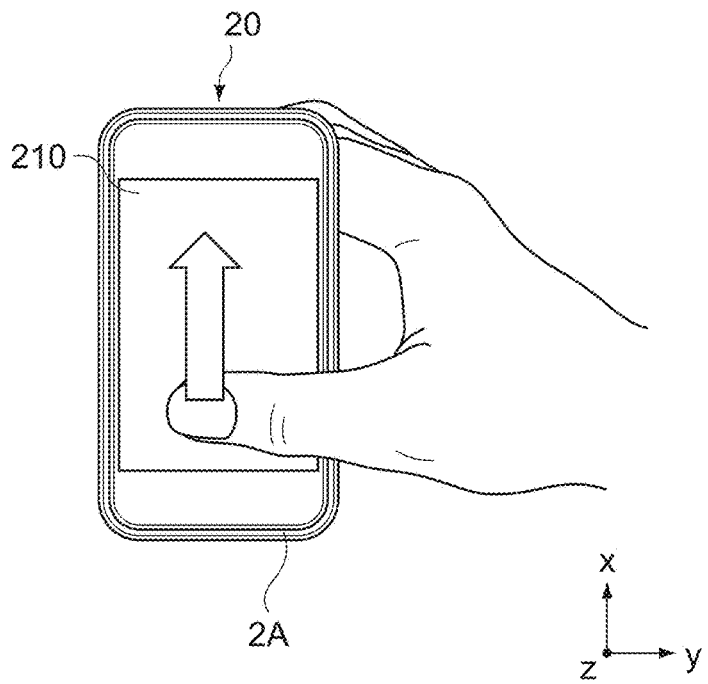
FIG. 9A shows an input operation surface of an input device on which a user makes an input operation and FIG. 9B shows an operation screen presented to the user through the HMD.
Figure 9B:
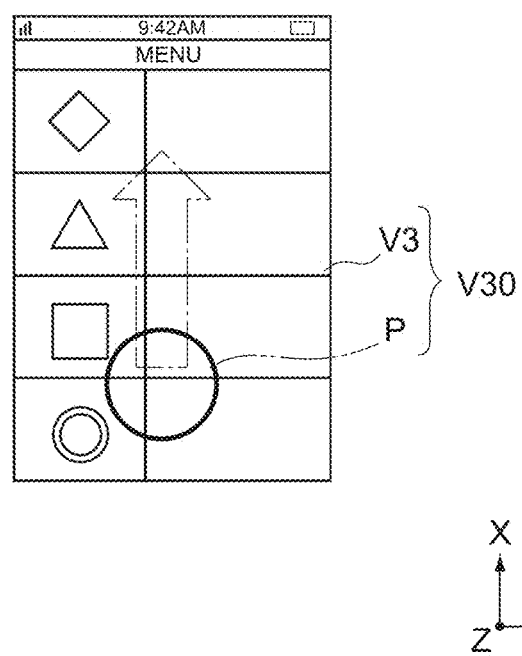

FIGS. 7 to 9 are views each explaining a second embodiment of the present technology. FIG. 7 is a block diagram showing an internal configuration of an input device according to this embodiment. FIG. 8 is a block diagram showing an internal configuration of an image display apparatus according to a head-mounted display of this embodiment. FIG. 9 are views each explaining a typical operation example of the information display apparatus, in which FIG. 9A shows an input operation surface of the input device on which the user makes an input operation and FIG. 9B shows an operation screen presented to the user through the HMD. In this embodiment, descriptions of the same portions as the configurations and actions of the first embodiment will be omitted or simplified and portions different from the first embodiment will be mainly described.

The second embodiment is different from the first embodiment in that an input device 20 according to this embodiment does not include a display element and an image is not displayed on an input operation surface 210. That is, in this configuration, a detection signal of an xy-coordinate position detected by a touch sensor 220 is set to be transmitted as an operation signal to an HMD 10 via a transceiver 270. Accordingly, as shown in FIG. 9A, the image is not displayed on the input operation surface 210 and the input device 20 includes only a so-called touch panel (touch pad). That is, the input device 20 according to this embodiment is set as a remote controller dedicated to the HMD 10.

The input device 20 includes a controller 250 including a driver circuit that drives the touch sensor 220 and a storage unit 260, the storage unit 260 storing programs and the like for controlling operations of the transceiver 270 and a communication unit 280 that is installed if necessary. In this embodiment, on the input operation surface 210 of the input device 20, only an input operation by the detection target is made. Therefore, the input operation surface 210 can be constituted of a non-light-transmissive material. The touch sensor 220 has the same configuration as the touch sensor 22 described above in the first embodiment and therefore a description thereof is omitted.

In this embodiment, a controller 130 according to an image display apparatus 110 of the HMD 10 includes an arithmetic unit 131 and a display processor 132. Based on the operation signal outputted from the touch sensor 220 of the input device 20, the arithmetic unit 131 calculates the xy-coordinate position of the finger. Based on the processing result inputted from the arithmetic unit 131, the display processor 132 generates an image to be displayed by an image display element 140. At this time, the display processor 132 generates a signal for displaying an auxiliary image such as a pointer in a position of the image on the input operation surface 210, the position corresponding to the xy-coordinate position of the detection target. Accordingly, as shown in FIG. 9B, it becomes possible for the HMD 10 to display an operation image V30 similar to the operation image V10 according to the first embodiment to the user.

In addition, the image to be presented to the user by the HMD 10 may be obtained via the communication unit 280 of the input device 20 over the Internet or the like. Alternatively, the HMD 10 may be provided with a communication unit 170 so as to generate an image based on information obtained directly by the HMD 10. In addition, programs (operating system and application software) necessary for displaying an operation screen may be stored on storage unit 150 of the HMD 10 so as to be executable by the controller 130 of the HMD 10.

In this embodiment, the configuration of the input device 20 can be simplified. Accordingly, it becomes possible to reduce the size and weight of the input device 20. Therefore, it becomes possible to provide the input device 20 that causes less fatigue for the user even during a prolonged touch operation and is easy to carry.

Third Embodiment

Figure 10:
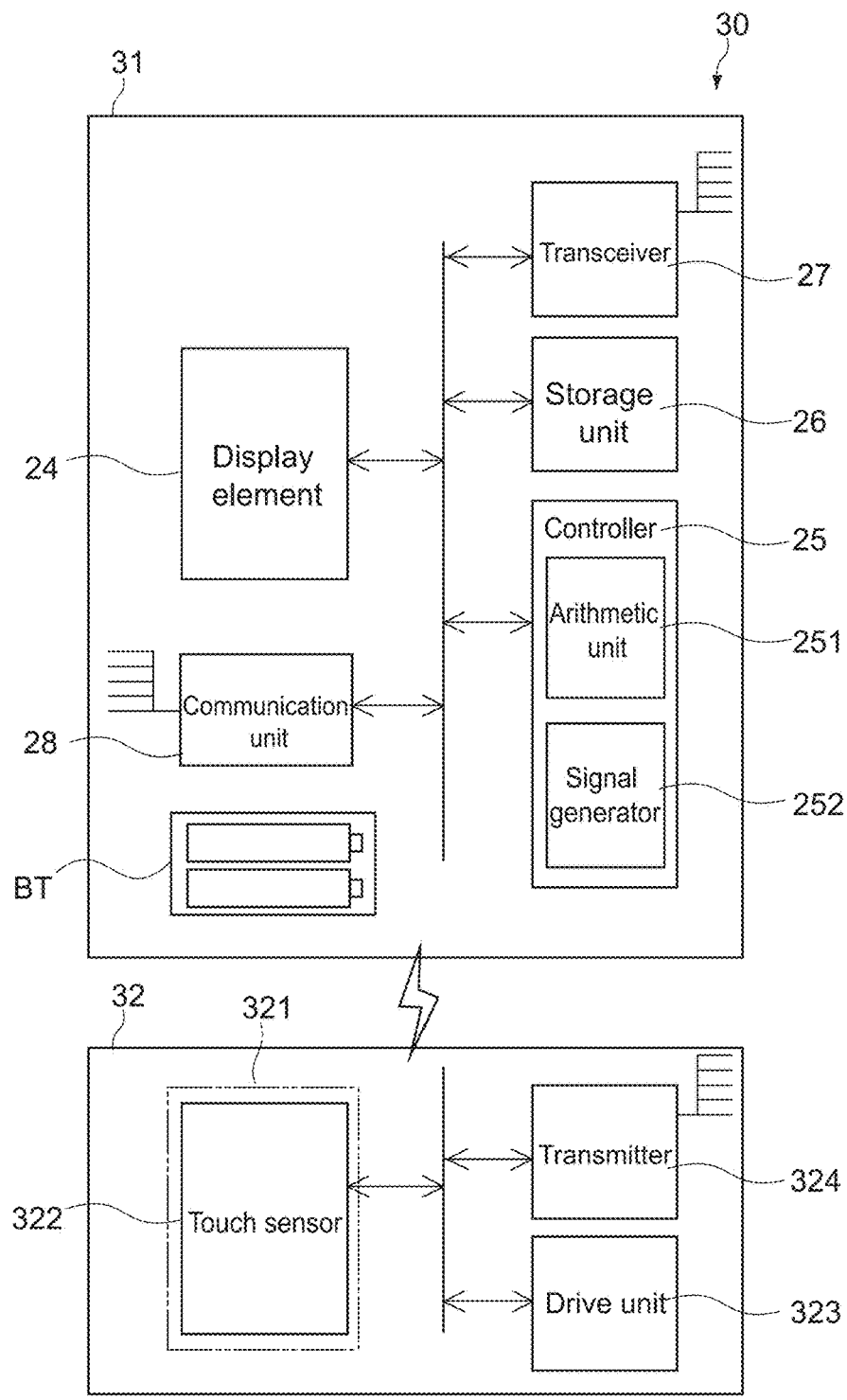
FIG. 10 is a block diagram showing an internal configuration of an input device according to a third embodiment of the present technology.

FIG. 10 is a block diagram showing an internal configuration of an input device according to a third embodiment of the present technology. In this embodiment, descriptions of the same portions as the configurations and actions of the first embodiment will be omitted or simplified and portions different from the first embodiment will be mainly described.

The third embodiment is different from the first embodiment in that an input device 30 according to this embodiment includes a portable terminal 31 that is communicable to the HMD 1 and a sensor panel 32 that is electrically connectable to the portable terminal 31 in a wireless or wired manner and the portable terminal 31 and the sensor panel 32 are configured as separate members.

The portable terminal 31 has the same functions as the input device 2 according to the first embodiment. However, the portable terminal 31 does not include a touch sensor for detecting an operation position (finger) of the user and is configured to calculate a coordinate position and a proximity distance by the controller 25 based on a coordinate signal of an operation position that is outputted from the sensor panel 32. The transceiver 27 of the portable terminal 31 has a function of receiving an output of a touch sensor 322 that is transmitted from the sensor panel 32 and a function of transmitting an operation signal generated in the controller 25 to the HMD 1.

The sensor panel 32 includes an input operation surface 321, the touch sensor 322, a drive unit 323 that drives the touch sensor 322, and a transmitter 324. The touch sensor 322 is capable of outputting information on the coordinate position and the proximity distance of the detection target to the input operation surface 321. The transmitter 324 transmits the output of the touch sensor 322 to the portable terminal 31. The touch sensor 322 has the same configuration as the touch sensor 22 described above in the first embodiment and therefore a description thereof is omitted.

In the information display apparatus according to this embodiment, an input signal inputted into the sensor panel 32 is transmitted to the HMD 1 via the portable terminal 31. Therefore, even when the portable terminal 31 do not have a non-contact detection function for the finger of the user, the same action and effect as those of the first embodiment can be obtained.

Fourth Embodiment

FIGS. 11 to 13 are views each explaining a fourth embodiment of the present technology. In this embodiment, the same portions as the configurations and actions of the first embodiment will be denoted by the same reference symbols, descriptions thereof will be omitted or simplified, and portions different from the first embodiment will be mainly described.

The fourth embodiment is different from the first embodiment in that, in which embodiment, a display mode of an auxiliary image (pointer) P4 is changed depending on a proximity distance of a detection target (finger) to the input operation surface 21.

Figure 11A:
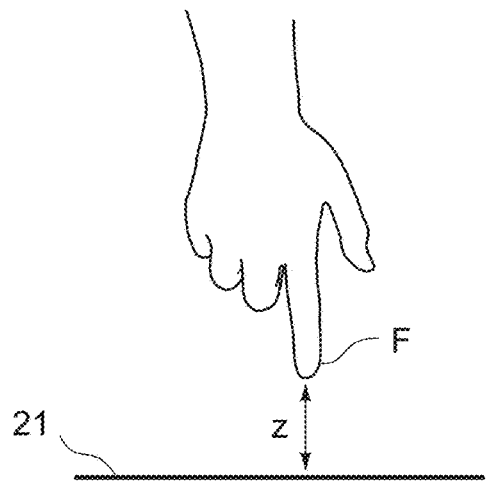
FIGS. 11A and 11B are schematic views each explaining an example in which a display mode of an auxiliary image changes depending on a distance between a finger and an input operation surface in a fourth embodiment of the present technology.
Figure 11B:
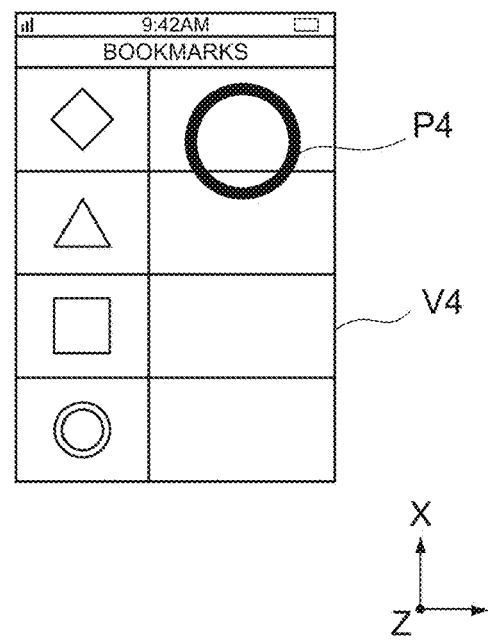
Figure 12A:
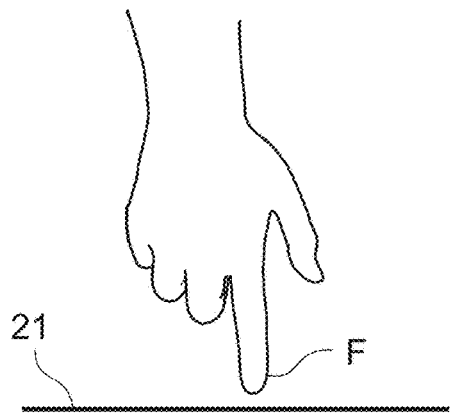
FIGS. 12A and 12B are schematic views each explaining an example in which the display mode of the auxiliary image changes depending on the distance between the finger and the input operation surface in the fourth embodiment of the present technology.
Figure 12B:
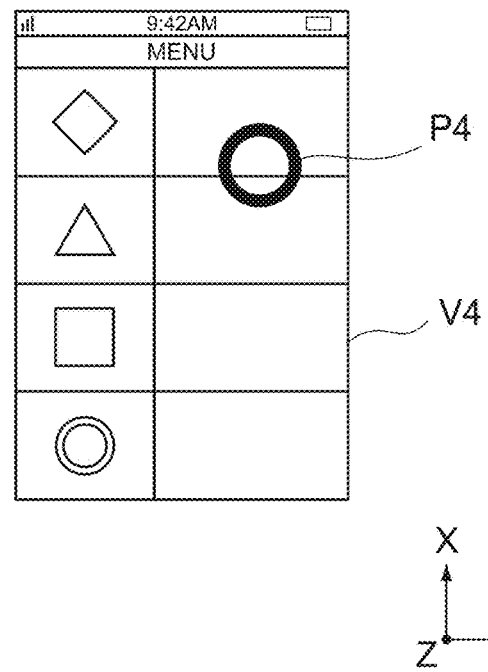

FIGS. 11 and 12 each show an example in which as a distance z between the input operation surface 21 and a finger F becomes larger, an annular pointer P4 on an image V4 is displayed in a larger size. FIGS. 11A and 11B each show a state (first state) when the finger F is spaced away from the input operation surface 21 by the finger F. FIGS. 12A and 12B each show a state (second state) when the finger F is close to the input operation surface 21 with a distance smaller than the distance z.

By changing the size of the pointer P4 depending on a relative distance between the finger F and the input operation surface 21 in this manner, it becomes easy for the user to determine a spaced distance and a proximity distance of the finger F to the input operation surface 21. Accordingly, it is possible to enhance absolute-position touch input operability.

Figure 13A:
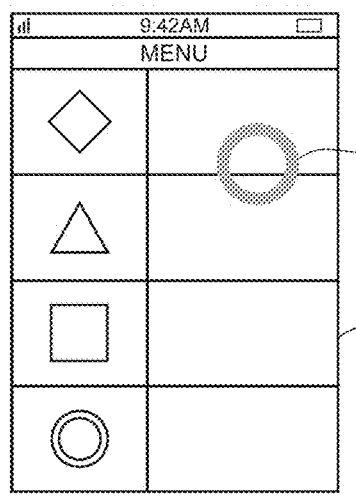
FIGS. 13A and 13B are schematic views each explaining an example in which the display mode of the auxiliary image changes depending on the distance between the finger and the input operation surface in the fourth embodiment of the present technology.
Figure 13B:
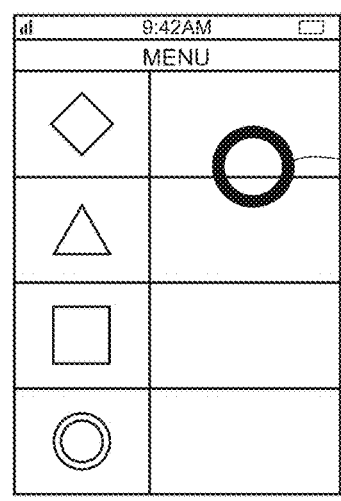

On the other hand, FIG. 13A shows the display mode of the pointer P4 on the image V4 in the first state and FIG. 13B shows the display mode of the pointer P4 on the image V4 in the second state. In this example, as the finger F becomes closer to the input operation surface 21, a display density of the pointer P4 is set to increase. Also by changing the display density of the pointer P4 depending on the relative distance between the finger F and the input operation surface 21 in this manner, the same action and effect as those described above can be obtained.

It should be noted that in addition to those described above, by changing the display mode such as a pointer display color, a pointer transparency, or a pointer brightness (contrast), the display mode of the pointer may be changed depending on the proximity distance of the finger to the input operation surface.

Fifth Embodiment

Figure 14A:
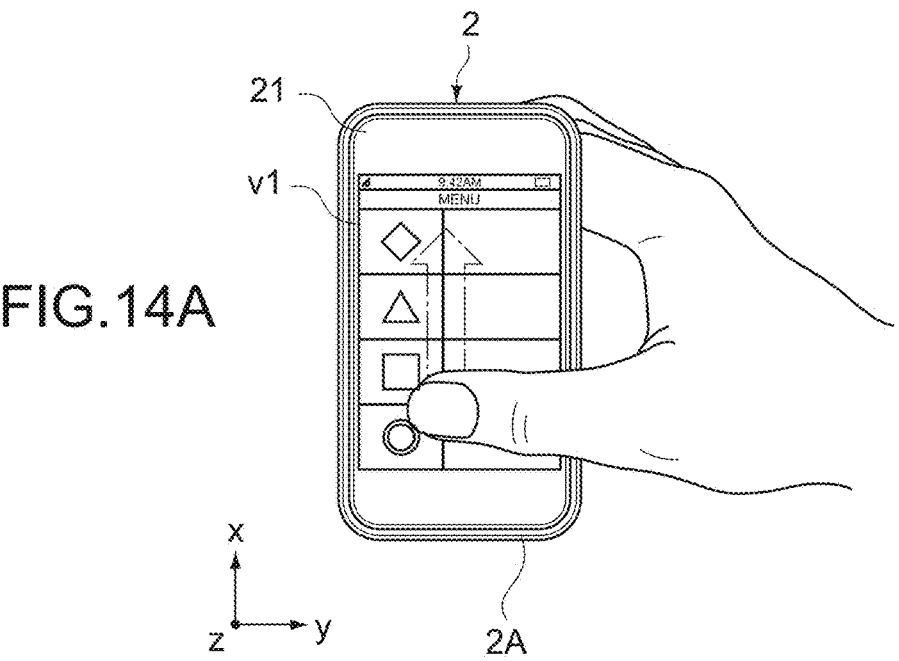
FIGS. 14A and 14B are schematic views each explaining an example in which a display mode of an auxiliary image changes depending on a distance between a finger and an input operation surface in a fifth embodiment of the present technology.
Figure 14B:
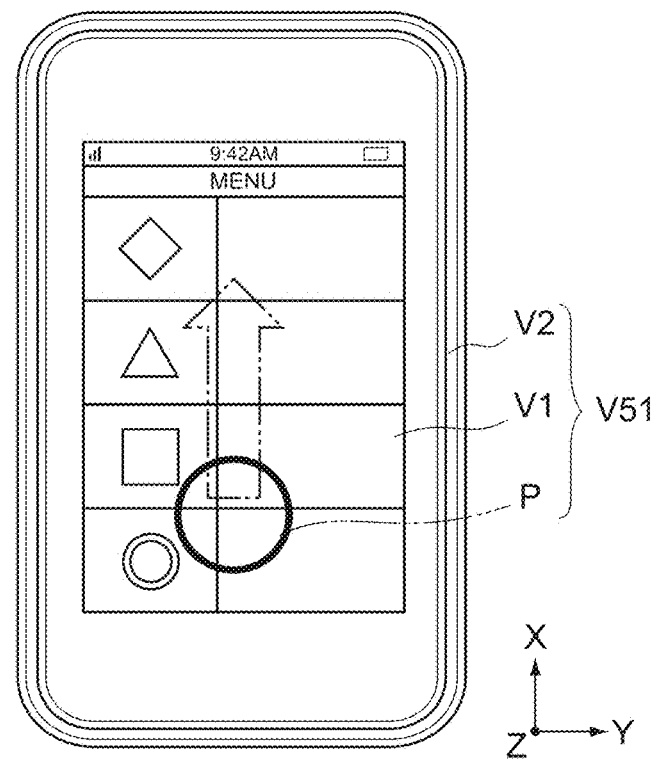

Next, referring to FIGS. 14 and 15, a fifth embodiment of the present technology will be described. FIGS. 14A and 15A each show an input operation surface of an input device on which the user makes an input operation. FIGS. 14B and 15B each show an operation screen to be presented to the user via an HMD. In this embodiment, the same portions as the configurations and actions of the first embodiment will be denoted by the same reference symbols, descriptions thereof will be omitted or simplified, and portions different from the first embodiment will be mainly described.

The fifth embodiment is different from the first embodiment in that, in this embodiment, another image including a display image v1 of the input device 2 is displayed in the field of view of the HMD 1. For example, in the examples shown in FIGS. 14A and 14B, in an operation image V51 displayed in the field of view of the HMD 1, not only the pointer P but also an image V2 expressing an outer appearance of the input device 2 are displayed while being overlapped on an image V1 corresponding to the display image v1. Accordingly, it is possible to provide the user wearing the HMD 1 with feeling as if he makes an operation while actually viewing the input device 2.

Figure 15A:
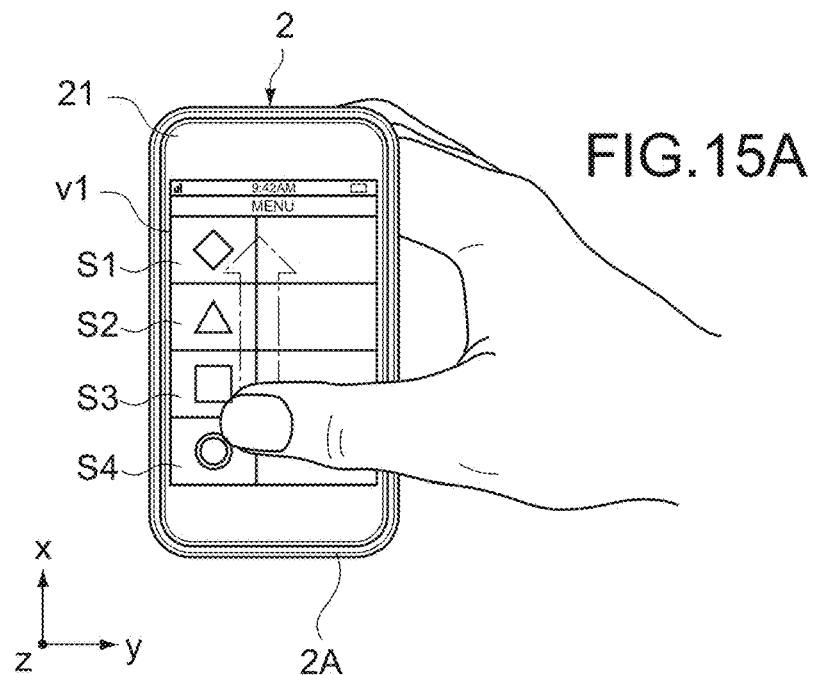
FIGS. 15A and 15B are views each explaining the fifth embodiment of the present technology.
Figure 15B:
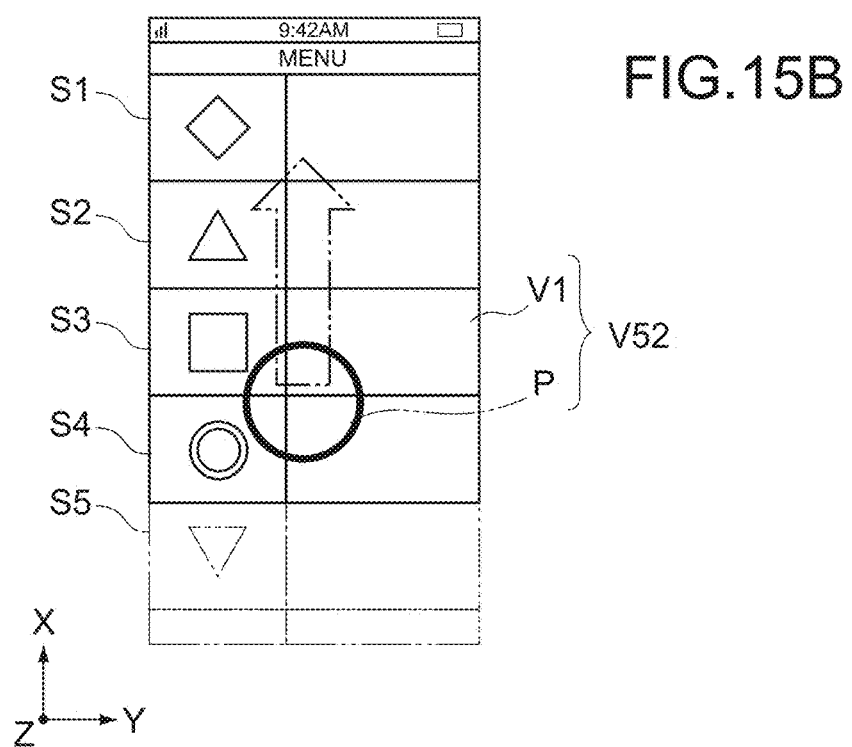

Next, the display image v1 of the input device 2 shown in FIG. 15A shows a state in which a plurality of indicated items S1, S2, S3, and S4 are displayed in sequence to move from a lower portion to an upper portion of a screen by a movement operation of the finger from the lower portion to the upper portion of the screen. On the other hand, as shown in FIG. 15B, in the field of view of the HMD 1, an operation image V52 in which an indicated item S5 being a next candidate of the indicated items follows the indicated item S4 is displayed. Such an operation image V52 is formed in the HMD 1 based on an image signal of the operation signal transmitted from the input device 2. It should be noted that a selection operation is actually unable to be made on the indicated item S5 not displayed in the display image v1, and hence the indicated item S5 may be displayed in a different form from other indicated items S1 to S4 so that the user can identify the indicated item S5.

According to the above-mentioned example, it is possible to realize an assist function of an input operation for the user. Thus, it becomes possible to provide a more user-friendly operation environment. Further, such a function is applicable to not only the display of the list of selection candidates but also a navigation map image and the like.

Sixth Embodiment

Next, referring to FIGS. 16A and 16B, a sixth embodiment of the present technology will be described. In this embodiment, the same portions as the configurations and actions of the first embodiment will be denoted by the same reference symbols, descriptions thereof will be omitted or simplified, and portions different from the first embodiment will be mainly described.

An HMD according to this embodiment is configured to be capable of displaying, by an arbitrary operation, an operation image V10 displayed in the field of view of the HMD in another display area at a different mode.

Figure 16A:
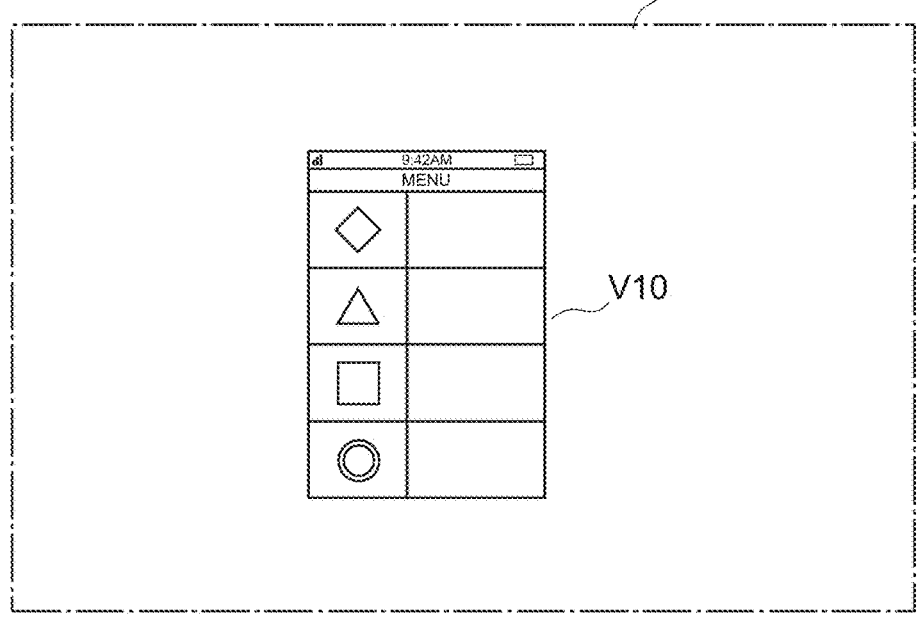
FIGS. 16A and 16B are views each explaining a sixth embodiment of the present technology.
Figure 16B:
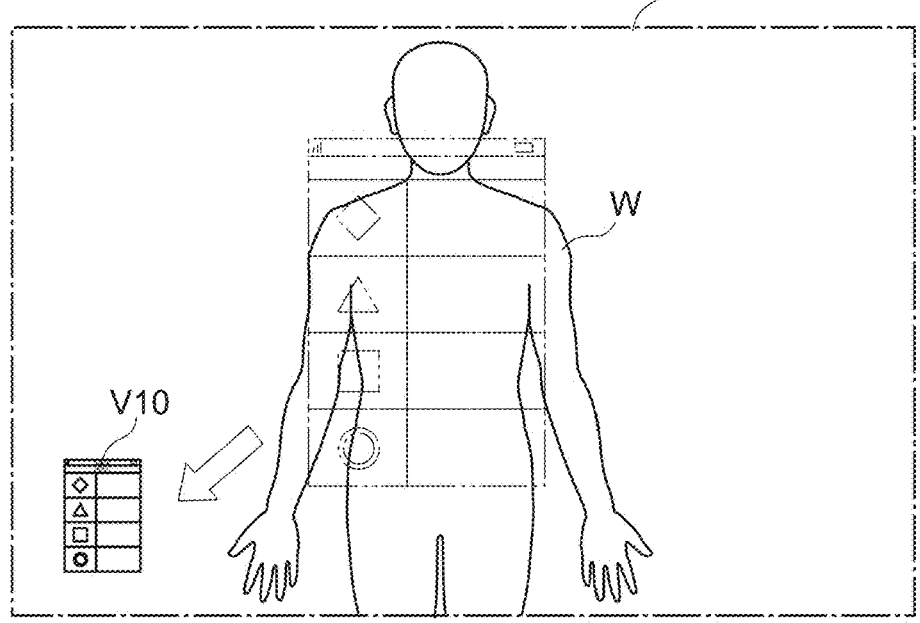

For example, the HMD according to this embodiment may be set to display the operation image V10 near the center of a field of view FV as shown in FIG. 16A. In the see-through HMD, the operation image V10 is displayed while being overlapped with the field of view in front of the user, and hence the operation image V10 sometimes becomes an obstruction, for example, when the user walks on a crowded street. In view of this, in the HMD according to this embodiment, by making a predetermined operation to move the operation image V10 to the edge of a field of view FV or reduce the display size of the operation image V10, as shown in FIG. 16B, a walker W or the like who is opposed to the user before him is made viewable, for example. Accordingly, it is possible to prevent the display of the operation image V10 from interfering with safe walking.

As the predetermined operation, an input operation on a predetermined switch separately provided to the HMD may be used or a predetermined gesture input and the like on the input operation surface 21 of the input device 2 may be used. Alternatively, a motion sensor such as an angular velocity sensor or an acceleration sensor may be provided to the HMD to detect a predetermined motion of the user, for example, shaking the head wearing the HMD in a predetermined direction and the display area, the display size, and the like of the operation image V10 may be changed.

Although the embodiments of the present technology have been described, the present technology is not limited thereto and various modifications can be made based on the technical concept of the present technology.

For example, although, in each of the above embodiments, the input device has been described as a portable terminal or the like that is held by the user for use, the input device is not limited thereto. For example, the input device may be as a wristwatch that the user wears on the wrist or may be as a wristband that the user wears on the arm. Alternatively, the input device may be in a form to be attached or adhere to clothes. Thus, in the present technology, input devices in various forms may be used as long as they are such apparatuses that the detection target can be held in contact with the input operation surface.

Further, although, in each of the above embodiments, the see-through HMD has been described, the present technology is not limited thereto and a non-see-through HMD may be employed. Also in this case, it becomes possible for the user to make an operation that matches intuition by making an operation while visually recognizing an image presented by the HMD without viewing the input operation surface of the input device.

Further, the HMD may be provided with an image pickup element so as to take an image of the outside. Accordingly, for example, it becomes also possible to cause the HMD and the input device to display the taken image.

Although, in each of the above embodiments, the example in which the pointer as the auxiliary image has an annular shape, the shape of the auxiliary image is off course not limited thereto. For example, any shapes including an arrow shape, a triangle shape, a quadrangle shape, a circular shape, and the like may be employed.

Figure 17:
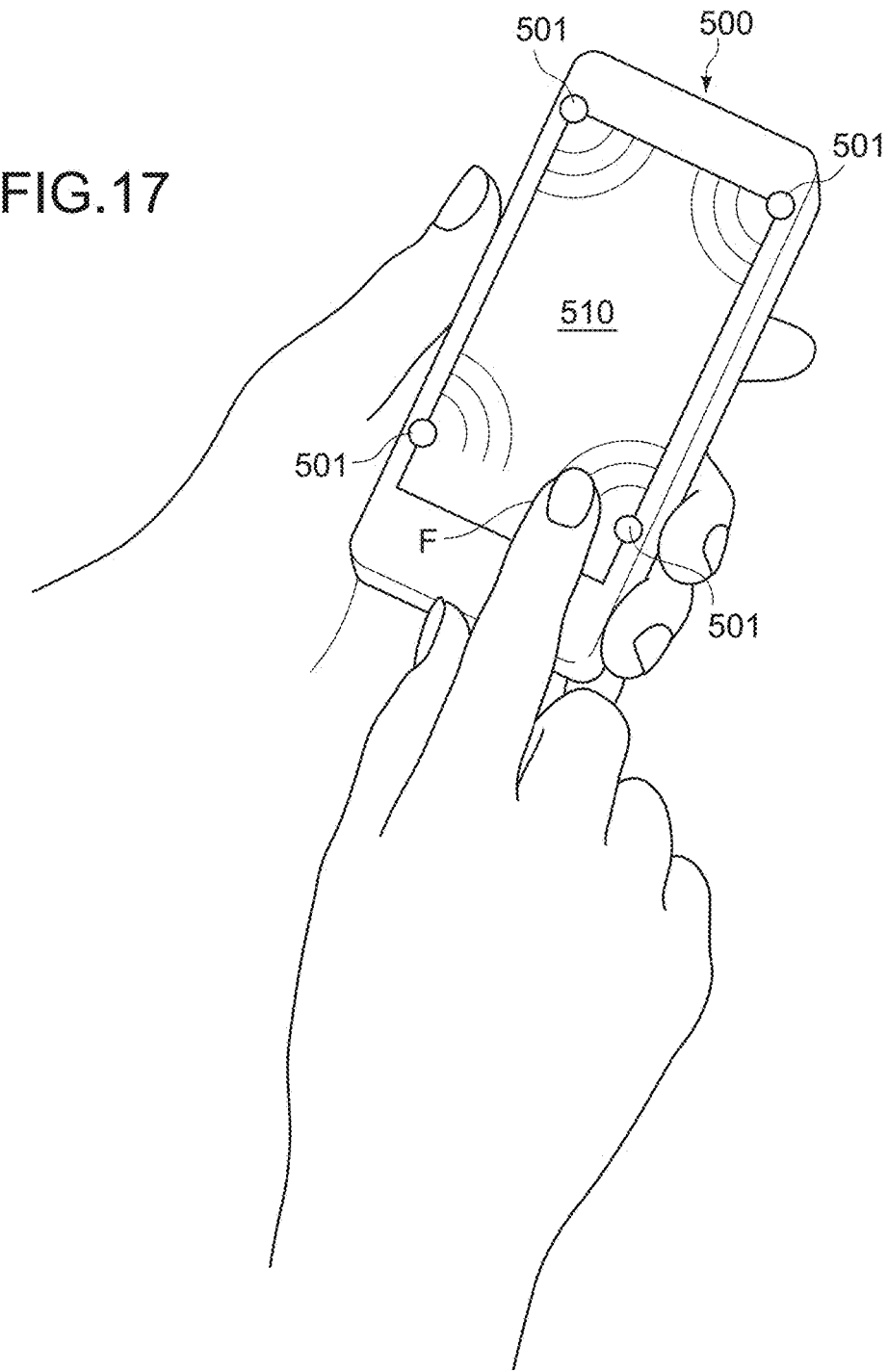
FIG. 17 is a perspective view showing a modified example of a configuration of an input device to be applied to the embodiments of the present technology.
Figure 18:
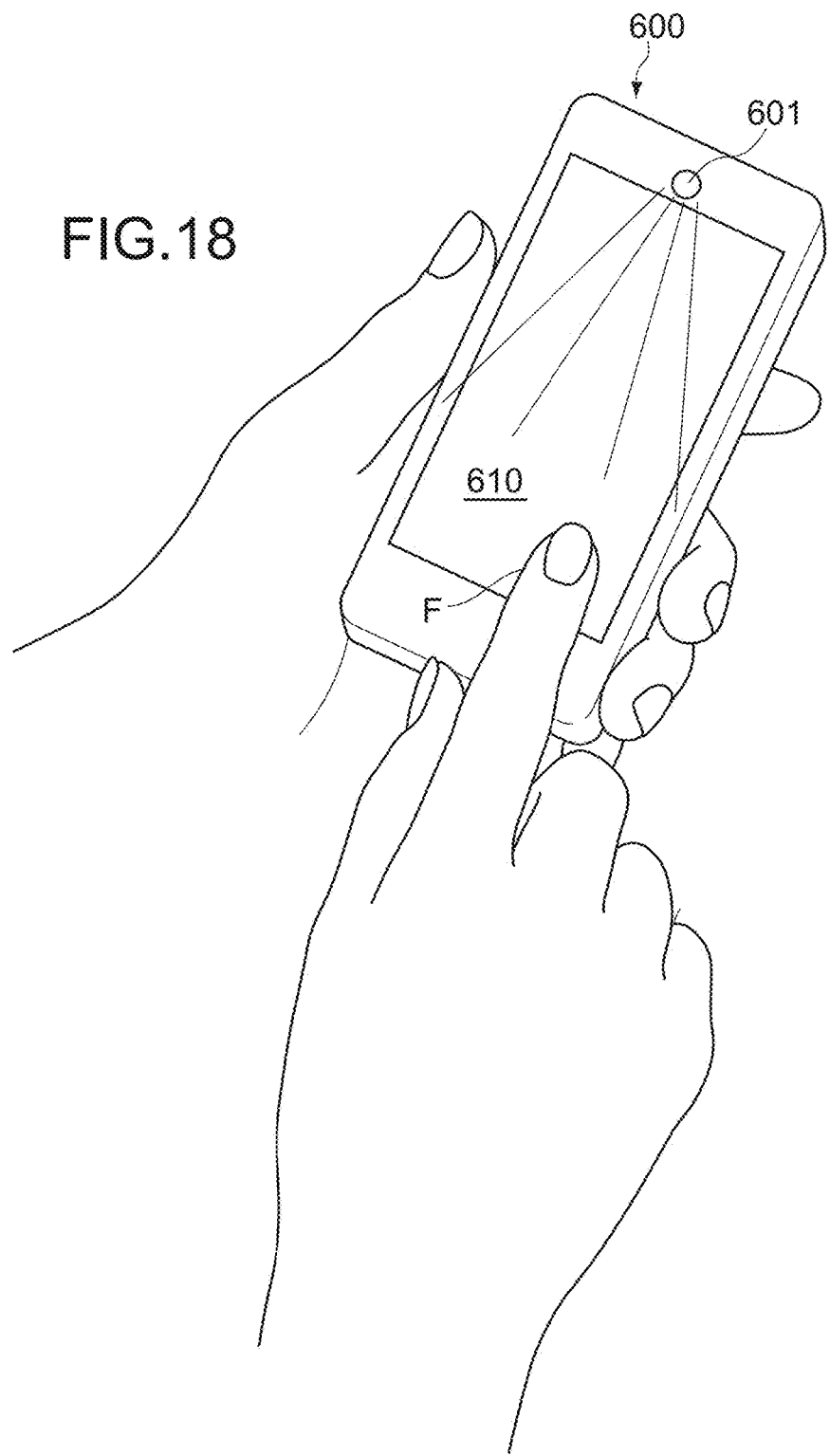
FIG. 18 is a perspective view showing a modified example of the configuration of the input device to be applied to the embodiments of the present technology.

Further, although, in each of the above embodiments, the capacitance volume touch sensor is used for detecting the proximity of the finger with respect to the input operation surface, the present technology is not limited thereto. For example, as shown in FIG. 17, an input device 500 including distance sensors 501 provided at four corners of a rectangular input operation surface 510 and an input device 600 including a camera 601 near an input operation surface 610 as shown in FIG. 18 may also be applicable to the present technology. In the input device 500 shown in FIG. 17, based on outputs of the respective distance sensors 501, for example, applying triangulation, a coordinate position and a proximity distance of a finger F on an input operation surface 510 are detected. On the other hand, in the input device 600 shown in FIG. 18, by processing an image of a finger F that is obtained by the camera 601, a coordinate position and a proximity distance of the finger F on the input operation surface 610 are detected.

It should be noted that the present technology may take the following configurations.
(1) A head-mountable display device comprising:
an image display device configured to be communicable with an input device and to display an operation image and an auxiliary image overlaid upon the operation image,
wherein the auxiliary image indicates three-dimensional positional information of a target object relative to an input operation surface of the input device.
(2) The head-mountable display device according to Item (1), wherein the image display device is at least partially see-through.
(3) The head-mountable display device according to Item (1), wherein the auxiliary image represents the three-dimensional positional information of the target object through at least one of a position of the auxiliary image, a size of the auxiliary image, and a shape of the auxiliary image.
(4) The head-mountable display device according to Item (1), wherein the three-dimensional positional information of the target object includes a distance of the target object to an input operation surface of the input device, and the distance of the target object to the input operation surface of the input device is represented by at least a relative size of the displayed auxiliary image.
(5) The head-mountable display device according to Item (4), wherein the image display device is configured to change the size of the auxiliary image in response to a detected change in distance of the target object relative to the input operation surface of the input device.
(6) The head-mountable display device according to Item (4), wherein the three-dimensional positional information of the target object includes XY coordinate position information of the target object relative to the surface of the input device, and the distance of the target object to the input operation surface of the input device is Z coordinate position information of the target object.
(7) The head-mountable display device according to Item (1), wherein the image display device includes a casing, a transceiver, a controller, an image display element, and a storage unit, wherein the transceiver is configured to receive an operation signal from the input device, the operation signal including the three-dimensional positional information of the target object.

(8) The head-mountable display device according to Item (1), wherein the operation image is representative of an image displayed on the input operation surface of the input device.

(9) The head-mountable display device according to Item (8), wherein the image display device is configured to receive an image signal from the input device, the image signal including information to generate the operation image on the image display device.

(10) The head-mountable display device according to Item (1), wherein the image display device is configured to display a primary image, the operation image being overlaid upon the primary image, and the auxiliary image being overlaid upon the operation image.

(11) The head-mountable display device according to Item (1), wherein the image display device is configured to display an indication of contact or non-contact of the target object with the input device.

(12) The head-mountable display device according to Item (11), wherein upon a change from a contact condition to a non-contact condition of the target object with the input device, a coordinate position of the target object corresponding to the prior contact condition is displayed in the operation image, thereby enabling an absolute-position touch input operation of the image display device.

(13) A method of displaying an image on a head-mountable display device, the method comprising:
  receiving, by an image display device of the head-mountable display device, three-dimensional positional information of a target object relative to an input device;
  displaying on the image display device an operation image and an auxiliary image overlaid upon the operation image,
  wherein the auxiliary image indicates the three-dimensional positional information of the target object relative to an input operation surface of the input device.

(14) The method according to Item (13), wherein the image display device is at least partially see-through.

(15) The method according to Item (13), wherein the auxiliary image represents the three-dimensional positional information of the target object through at least one of a position of the auxiliary image, a size of the auxiliary image, and a shape of the auxiliary image.

(16) The method according to Item (13), wherein the three-dimensional positional information of the target object includes a distance of the target object to an input operation surface of the input device, and the distance of the target object to the input operation surface of the input device is represented by at least a relative size of the displayed auxiliary image.

(17) The method according to Item (16), further comprising:
  detecting a change of a distance of the target object relative to the input operation surface of the input device; and
  changing the size of the auxiliary image in response to the detected change of the distance of the target object.

(18) The method according to Item (16), wherein the three-dimensional positional information of the target object includes XY coordinate position information of the target object relative to the surface of the input device, and the distance of the target object to the input operation surface of the input device is Z coordinate position information of the target object.

(19) The method according to Item (13), wherein the image display device includes a casing, a transceiver, a controller, an image display element, and a storage unit, the method further comprising:
  receiving, by the transceiver, an operation signal from the input device, the operation signal including the three-dimensional positional information of the target object.

(20) The method according to Item (13), wherein the operation image is representative of an image displayed on the input operation surface of the input device.

(21) The method according to Item (20), further comprising receiving, by the image display device, an image signal from the input device, the image signal including information to generate the operation image on the image display device.

(22) The method according to Item (13), further comprising displaying a primary image on the image display device, the operation image being overlaid upon the primary image, and the auxiliary image being overlaid upon the operation image.

(23) The method according to Item (13), further comprising displaying an indication of contact or non-contact of the target object with the input device on the image display device.

(24) The method according to Item (23), further comprising displaying a coordinate position of the target object corresponding to the prior contact condition in the operation image upon a change from a contact condition to a non-contact condition of the target object with the input device, thereby enabling an absolute-position touch input operation of the image display device.

(25) An information display system comprising:
  a head-mountable display device including an image display device that is configured to display a primary image and an auxiliary image overlaid upon the primary image; and
  an input device configured to measure three-dimensional positional information of a target object relative to an input operation surface of the input device,
  wherein the auxiliary image represents the three-dimensional positional information of the target object.

(26) The information display system of Item (25), wherein the input device includes a touch sensor selected from the group consisting of a resistive film sensor, an infrared sensor, an ultrasonic sensor, a surface acoustic wave sensor, an acoustic pulse recognition sensor, and an infrared image sensor.

(27) The information display system of Item (25), wherein the input device includes an input operation surface extending in X-axis and Y-axis directions, and perpendicular to a Z-axis direction, the input device configured to detect an XY coordinate position of an object relative to the input operation surface in the X-axis and Y-axis directions, and configured to detect a distance of the object from the input operation surface in the Z-axis direction.

(28) The information display system of Item (25), wherein the input device includes a sensing electrode that has a floating capacitance with respect to a ground potential.

It should be noted that the present technology may also take the following configurations.

(1) A head-mounted display, including:
  a receiver configured to receive an operation signal containing information on a relative position of a detection target that comes close to an input operation surface, the operation signal being transmitted from an input device;
  an image display element configured to form an image to be presented to a user; and a display processor configured to cause the image display element to display, based on the operation signal, an operation image in which an auxiliary image showing a position of the detection target is overlapped on the image.

(2) The head-mounted display according to Item (1), in which
the receiver is configured to further receive an image signal outputted from the input device, and
the display processor is configured to cause, based on the image signal, the image display element to display the image.

(3) The head-mounted display according to Item (1) or (2), in which
the display processor is configured to move, based on the operation signal, the auxiliary image in a display area of the image.

(4) The head-mounted display according to any one of Items (1) to (3), in which
the operation signal contains information on a proximity distance of the detection target to the input operation surface, and
the display processor is configured to change, depending on the proximity distance of the detection target to the input operation surface, a display mode of the auxiliary image.

(5) The head-mounted display according to any one of Items (1) to (4), further including an arithmetic unit configured to calculate, based on the operation signal, a coordinate position of the detection target on the input operation surface, in which
the display processor is configured to cause the image display element to display the operation image based on the coordinate position of the detection target that is calculated by the arithmetic unit.

(6) An information display apparatus, including:
an input device including
an input operation surface, and
a sensor unit configured to detect proximity of a detection target to the input operation surface and to output information on a coordinate position of the detection target on the input operation surface; and
a head-mounted display including
an image display element configured to form an image to be presented to a user, and
a display processor configured to cause the image display element to form, based on an output of the sensor unit, an operation image in which an auxiliary image showing a position of the detection target is overlapped on the image.

(7) The information display apparatus according to Item (6), in which
the input device further includes a display element configured to display an image on the input operation surface, and
the head-mounted display is configured to display an image in which the auxiliary image is overlapped on a display image displayed on the input operation surface, as the operation image.

(8) The information display apparatus according to Item (6) or (7), in which
the sensor unit includes a capacitance sensor configured to detect a change in capacitance between the input operation surface and the detection target.

(9) The information display apparatus according to any one of Items (6) to (8), in which
the sensor unit is configured to detect a movement of the detection target on the input operation surface, and the head-mounted display is configured to display the auxiliary image that moves depending on the detected movement of the detection target.

(10) The information display apparatus according to any one of Items (6) to (9), in which
the head-mounted display is configured to change, depending on a proximity distance of the detection target to the input operation surface, a display mode of the auxiliary image.

(11) The information display apparatus according to Item (7), in which
the head-mounted display is configured to further display an image expressing an outer appearance of the input device around the display image.

(12) An information display apparatus, including:
an input device including
an input operation surface, and
a sensor unit configured to detect proximity of a detection target to the input operation surface; and
a head-mounted display including
an image display element configured to form an image to be presented to a user,
an arithmetic unit configured to calculate, based on an output of the sensor unit, a coordinate position of the detection target on the input operation surface, and
a display processor configured to cause the image display element to form, based on the coordinate position of the detection target that is calculated by the arithmetic unit, an operation image in which an auxiliary image showing a position of the detection target is overlapped on the image.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 head-mounted display (HMD)
2, 20, 30 input device
13, 130 controller (display processor)
131 arithmetic unit
132 display processor
14, 140 image display element
21, 210 input operation surface
22, 220 touch sensor (sensor unit)
24 display element
100 information display apparatus
P pointer (auxiliary image)
V10 operation image

The invention claimed is:
1. A head-mountable display device, comprising:
a display screen; and
circuitry configured to:
communicate with an input device that is independent of the head-mountable display device,
wherein the input device includes at least one touch sensor, and
wherein the at least one touch sensor is beneath an input operation surface of the input device;
control the display screen to display a primary image, an operation image, and an auxiliary image, wherein the operation image is overlaid on the primary image, wherein the auxiliary image is overlaid on the operation image, wherein the operation image of a first size is displayed at a first display position on the display screen, wherein the auxiliary image indicates three-dimensional positional information of a target object relative to the input operation surface of the input device, and wherein the three-dimensional positional information of the target object includes a distance of the target object from the input operation surface of the input device;

change the first display position of the operation image of the first size to a second display position of the operation image of a second size on the display screen, based on at least an object included in the primary image, wherein the second display position is different from the first display position; and control the display screen to further display the operation image of the second size at the second display position.

2. The head-mountable display device according to claim 1, wherein the circuitry is further configured to control the display screen to display the operation image overlapped with a view of outside world.

3. The head-mountable display device according to claim 1, wherein the circuitry is further configured to indicate the three-dimensional positional information of the target object through at least one of a third display position of the auxiliary image on the display screen, a size of the auxiliary image, or a shape of the auxiliary image.

4. The head-mountable display device according to claim 1, wherein the circuitry is further configured to indicate, the distance of the target object from the input operation surface of the input device, by at least a relative size of the auxiliary image.

5. The head-mountable display device according to claim 1, wherein the circuitry is further configured to:

detect a change in the distance of the target object relative to the input operation surface of the input device, and change a size of the auxiliary image based on the detected change in the distance of the target object relative to the input operation surface of the input device.

6. The head-mountable display device according to claim 1, wherein the three-dimensional positional information of the target object includes XY coordinate position information of the target object relative to the input operation surface of the input device, and wherein the distance of the target object to the input operation surface of the input device is Z coordinate position information of the target object.

7. The head-mountable display device according to claim 1, further comprising at least one of a casing, a transceiver, a controller, an image display element, or a storage unit, wherein the transceiver is configured to receive an operation signal from the input device, and wherein the operation signal includes the three-dimensional positional information of the target object.

8. The head-mountable display device according to claim 1, wherein the operation image is representative of an image displayed on the input operation surface of the input device.

9. The head-mountable display device according to claim 1, wherein the circuitry is further configured to control the display screen to display an indication of one of a contact of the target object with the input device or non-contact of the target object with the input device.

10. The head-mountable display device according to claim 1, wherein the circuitry is further configured to:

increase a size of the auxiliary image with an increase in the distance between the target object and the input operation surface, and decrease the size of the auxiliary image with a decrease in the distance between the target object and the input operation surface.

11. The head-mountable display device according to claim 1, wherein the circuitry is further configured to control the display screen to display an image of an outer appearance of the input device, wherein the operation image is overlaid on the image of the outer appearance of the input device.

12. The head-mountable display device according to claim 1, wherein the circuitry is further configured to change a transparency of the auxiliary image based on the distance between the target object and the input operation surface.

13. The head-mountable display device according to claim 1, wherein the object included in the primary image is one of a vehicle or a person.

14. A method, the method comprising:

in a head-mountable display device:

receiving, by an image display device of the head-mountable display device, three-dimensional positional information of a target object relative to an input device that is independent of the head-mountable display device, wherein the input device includes at least one touch sensor, and wherein the at least one touch sensor is beneath an input operation surface of the input device;

displaying, on the image display device, a primary image, an operation image, and an auxiliary image, wherein the operation image is overlaid on the primary image, wherein the auxiliary image is overlaid on the operation image, wherein the operation image of a first size is displayed at a first display position on the image display device, wherein the auxiliary image indicates the three-dimensional positional information of the target object relative to the input operation surface of the input device, and wherein the three-dimensional positional information of the target object includes a distance of the target object from the input operation surface of the input device;

changing the first display position of the operation image of the first size to a second display position of the operation image of a second size on the image display device, based on at least an object included in the primary image, wherein the second display position is different from the first display position; and displaying, on the image display device, the operation image of the second size at the second display position.

15. The method according to claim 14, further comprising:

detecting a change in the distance of the target object relative to the input operation surface, and changing a size of the auxiliary image based on the detected change in the distance of the target object relative to the input operation surface.

16. The method according to claim 14, wherein the three-dimensional positional information of the target object includes XY coordinate position information of the target object relative to the input operation surface of the input device, and wherein the distance of the target object from the input operation surface of the input device is Z coordinate position information of the target object.

17. The method according to claim 14, wherein the image display device includes at least one of a casing, a transceiver, a controller, an image display element, or a storage unit, wherein the method further comprising:

receiving, by the transceiver, an operation signal from the input device, wherein the operation signal including the three-dimensional positional information of the target object.

18. The method according to claim 14, wherein the operation image is representative of an image displayed on the input operation surface of the input device.

19. The method according to claim 14, further comprising displaying an indication of one of a contact of the target object with the input device or non-contact of the target object with the input device on the image display device.

20. An information display system, comprising:

a head-mountable display device including an image display device configured to display a primary image, an operation image, and an auxiliary image;

wherein the operation image is overlaid on the primary image, wherein the auxiliary image is overlaid on the operation image, and wherein the operation image of a first size is displayed at a first display position on the image display device;

an input device that is independent of the head-mountable display device, wherein the input device includes at least one touch sensor, wherein the at least one touch sensor is beneath an input operation surface of the input device, wherein the input device is configured to measure three-dimensional positional information of a target object relative to the input operation surface of the input device, wherein the three-dimensional positional information of the target object includes a distance of the target object from the input operation surface of the input device, and wherein the auxiliary image represents the three-dimensional positional information of the target object; and a display processor configured to:

change the first display position of the operation image of the first size to a second display position of the operation image of a second size on the image display device, based on at least an object included in the primary image, wherein the second display position is different from the first display position; and control the image display device to further display the operation image of the second size at the second display position.

* * * * *